United States Patent
Kashiwagi et al.

(10) Patent No.: US 9,590,428 B2
(45) Date of Patent: Mar. 7, 2017

(54) ELECTRIC POWER RECEIVING DEVICE AND METHOD OF RECEIVING ELECTRIC POWER

(71) Applicant: CENTRAL JAPAN RAILWAY COMPANY, Aichi (JP)

(72) Inventors: Yuki Kashiwagi, Narashino (JP); Toshiaki Murai, Hachioji (JP); Yoshiyasu Hagiwara, Yamato (JP); Tadashi Sawada, Kawaguchi (JP)

(73) Assignee: CENTRAL JAPAN RAILWAY COMPANY, Aichi (JP)

( * ) Notice: Subject to any disclaimer, the term of this patent is extended or adjusted under 35 U.S.C. 154(b) by 183 days.

(21) Appl. No.: 14/637,257

(22) Filed: Mar. 3, 2015

(65) Prior Publication Data
US 2015/0249345 A1   Sep. 3, 2015

(30) Foreign Application Priority Data
Mar. 3, 2014 (JP) .................................. 2014-040708

(51) Int. Cl.
H02J 3/04 (2006.01)
H02J 5/00 (2016.01)

(52) U.S. Cl.
CPC .............. H02J 5/005 (2013.01); H02J 50/12 (2016.02); *Y02B 70/1441* (2013.01)

(58) Field of Classification Search
CPC ........................................................ H02J 3/04
See application file for complete search history.

(56) References Cited

U.S. PATENT DOCUMENTS 9,231,494 B2 *  1/2016 Sawada ................... H02J 5/005
2012/0326515 A1* 12/2012 Murai ..................... H02J 5/005
                                                           307/72
(Continued)

FOREIGN PATENT DOCUMENTS

JP   H10108390     4/1998
JP   2012143135    7/2012
(Continued)

*Primary Examiner* — Rexford Barnie
*Assistant Examiner* — Daniel Kessie
(74) *Attorney, Agent, or Firm* — Koppel, Patrick, Heybl & Philpott

(57) ABSTRACT

An electric power receiving device in one aspect of embodiments of the present disclosure comprises an electric power receiving section and a converting section. The converting section comprises a compensation voltage generating section. The compensation voltage generating section generates a compensation voltage capable of canceling out a reactance component in the electric power receiving section, and applies the compensation voltage to the electric power receiving section. The compensation voltage generating section comprises a phase changing section, a physical quantity detecting section, and a searching section. The searching section searches a target phase of the compensation voltage that brings the electric power receiving device into a substantially resonant state, based on a physical quantity detected by the physical quantity detecting section. The compensation voltage generating section determines the compensation voltage having the target phase as the compensation voltage to be applied to the electric power receiving section.

11 Claims, 12 Drawing Sheets

(56) References Cited

U.S. PATENT DOCUMENTS

| | | |
|---|---|---|
| 2014/0292092 A1 | 10/2014 | Ichinose et al. |
| 2014/0372780 A1 | 12/2014 | Murai et al. |
| 2015/0023079 A1 | 1/2015 | Sawada et al. |

FOREIGN PATENT DOCUMENTS

| | | |
|---|---|---|
| JP | 2013143135 | 7/2012 |
| JP | 2014195387 | 10/2014 |
| JP | 2014241698 | 12/2014 |
| JP | 2015023658 | 2/2015 |

* cited by examiner

ELECTRIC POWER RECEIVING DEVICE AND METHOD OF RECEIVING ELECTRIC POWER

CROSS-REFERENCE TO RELATED APPLICATIONS

This application claims the benefit of Japanese Patent Application No. 2014-040708 filed Mar. 3, 2014 in the Japan Patent Office, the disclosure of which is incorporated herein by reference.

BACKGROUND

The present disclosure relates to a technique for receiving an electric power from a primary coil via magnetic coupling and supplying the electric power to a load.

An electric power receiving device of various types has been proposed that includes a secondary-side coil (secondary coil) provided so as to face a primary-side induction line (primary coil) and is configured to generate an induced voltage in the secondary coil by a high-frequency current flowing through the primary coil and to generate an electric power for driving a load based on the generated induced voltage.

An example of an electric power receiving circuit disclosed in Japanese Unexamined Patent Application Publication No. H10-108390 is configured to rectify an output of a resonance circuit formed of a secondary-side coil and a capacitor connected in parallel to each other, to convert the rectified voltage into an output voltage having a specified voltage value, and to output the output voltage to a load. In this electric power receiving circuit, a resonance frequency of the resonance circuit is matched to a frequency of a high-frequency current flowing through a primary-side induction line, and an electric power can thereby be received efficiently from the induction line.

However, a value of inductance in the secondary coil and a value of capacitance in the capacitor actually have variations depending on characteristics of elements. Furthermore, the value of inductance in the secondary coil is also changed due to temperature of the secondary coil, energizing current, secular changes, and so on. Thus, in the above-described electric power receiving circuit, it is not easy, actually, to resonate the secondary-side resonance circuit at a frequency of an alternating current flowing through the primary-side induction line.

On the other hand, in an example of an electric power receiving device disclosed in Japanese Unexamined Patent Application Publication No. 2012-143135, such a problem that the resonance point is not fixed due to various factors, such as variations in characteristics of elements, and so on, is solved as follows. Specifically, this electric power receiving device includes an electric power receiving section having a series resonance circuit configured with a secondary coil and a resonance capacitor, and is configured to convert an electric power inputted from the electric power receiving section into a direct current by means of a converter and to supply the direct current to a load. It is preferred that the series resonance circuit is fully resonant at a frequency of an alternating current on the primary coil side (i.e., it is preferred that a combined reactance becomes zero at the frequency); however, it is often the case, actually, that the resonance point is not fixed due to various factors, such as variations in characteristics of elements, and so on, and that a voltage (reactance voltage) is generated in the series resonance circuit.

Thus, in this electric power receiving device, a reducing-voltage for reducing the reactance voltage generated in the electric power receiving section is generated by the converter, and the reducing-voltage is applied to the electric power receiving section. An actual input current inputted from the electric power receiving section is detected, and the reducing-voltage is calculated using the detected input current and an impedance (including the combined reactance in the series resonance circuit) in the electric power receiving section. According to this technique, the reducing-voltage corresponding to the actual input current is calculated and applied to the electric power receiving section, and thus, in the electric power receiving device as a whole, inhibition of occurrence of resonance by the reactance voltage in the electric power receiving section can be reduced.

SUMMARY

According to the above-described one example of the electric power receiving device, inhibition of occurrence of resonance can be reduced to some extent because the reducing-voltage is generated and applied based on the actual input current. However, the impedance in the electric power receiving section used for generating the reducing-voltage is a design value (constant value), and thus, is highly likely to be different from an actual value of the impedance in view of various factors, such as variations in characteristics of elements, temperature, and secular changes.

Consequently, in the above-described one example of the electric power receiving device, it is not necessarily possible to apply an optimum reducing-voltage (reducing-voltage for achieving a full resonance) to the electric power receiving section. In order to apply the optimum reducing-voltage or a reducing-voltage close thereto to the electric power receiving section, the impedance used for calculating the reducing-voltage has to be readjusted sequentially. However, such readjustment is not easy and requires enormous cost and time.

In one aspect of embodiments of the present disclosure, it is preferred to be able to provide a technique that can cause resonance to occur easily and appropriately at a frequency of an alternating current flowing through a primary coil, even when an inductance in a secondary coil is changed (and thus, a combined reactance in an electric power receiving section is changed) due to various factors, such as variations in characteristics of elements, temperature, and secular changes.

An electric power receiving device in one aspect of embodiments of the present disclosure comprises an electric power receiving section and a converting section. The electric power receiving section comprises a pair of output terminals and a secondary coil to be electromagnetically coupled to a primary coil through which a first alternating current flows. The electric power receiving section outputs, via the pair of output terminals, an alternating voltage that is based on an induced electromotive force generated in the secondary coil. The converting section converts the alternating voltage outputted from the electric power receiving section into a direct voltage. The converting section comprises a compensation voltage generating section. The compensation voltage generating section generates a compensation voltage having a frequency approximately equal to that of the alternating voltage and being capable of canceling out a reactance component in the electric power receiving section, and applies the compensation voltage between the pair of output terminals.

The compensation voltage generating section comprises a phase changing section, a physical quantity detecting section, and a searching section. The phase changing section changes a phase of the compensation voltage to be applied between the pair of output terminals in a specified change pattern. The physical quantity detecting section detects a specified physical quantity changed with change of the phase of the compensation voltage by the phase changing section. The searching section searches a target phase of the compensation voltage that brings the electric power receiving device into a substantially resonant state, based on the physical quantity detected by the physical quantity detecting section.

The compensation voltage generating section determines the compensation voltage having the target phase searched by the searching section as the compensation voltage to be applied between the pair of output terminals.

According to the electric power receiving device of the present disclosure, the compensation voltage having the target phase that brings the electric power receiving device into the substantially resonant state is searched and determined based on the physical quantity changed with the change of the phase of the compensation voltage. Thus, even when a combined reactance in the electric power receiving section is changed due to various factors, an appropriate compensation voltage corresponding to the actual combined reactance is searched and determined.

Consequently, according to the electric power receiving device of the present disclosure, even when an inductance in the secondary coil is changed (and thus, the combined reactance in the electric power receiving section is changed) due to various factors, such as variations in characteristics of elements, temperature, and secular changes, resonance at a frequency of the alternating current flowing through the primary coil can be caused to occur easily and appropriately in the electric power receiving device as a whole.

The term "substantially resonant state" may include not only a full resonant state but also a state close to a resonant state.

The searching section may search the target phase in any manner based on the physical quantity detected by the physical quantity detecting section. For example, the searching section may search the target phase that causes a behavior of change in the physical quantity detected by the physical quantity detecting section to become a resonance behavior indicating that the electric power receiving device is in the substantially resonant state.

The compensation voltage generating section may comprise a current detecting section, an equivalent reactance component setting section, and a compensation voltage calculating section. The current detecting section detects a second alternating current that is based on the alternating voltage outputted from the electric power receiving section. The equivalent reactance component setting section sets an equivalent reactance component in the converting section. The compensation voltage calculating section calculates the compensation voltage by a specified calculation that is based on the equivalent reactance component set by the equivalent reactance component setting section and the second alternating current detected by the current detecting section.

When the compensation voltage generating section is configured as above, the phase changing section may change the phase of the compensation voltage by changing the equivalent reactance component set by the equivalent reactance component setting section in the above-described change pattern. The searching section may obtain the equivalent reactance component at the time the behavior of change becomes the resonance behavior, as information indicating the phase of the compensation voltage. The equivalent reactance component setting section may determine the equivalent reactance component obtained by the searching section as the equivalent reactance component to be set.

When the equivalent reactance component is changed, the phase of the compensation voltage is changed. Thus, by monitoring the change of the physical quantity at the time the equivalent reactance component is changed and by searching the equivalent reactance component that causes the behavior of change in the physical quantity to become the resonance behavior, the equivalent reactance component can be set at an appropriate value, and thus, resonance can occur easily and appropriately.

More specifically, the compensation voltage generating section may determine the appropriate compensation voltage as follows. To be specific, the phase changing section may perform a first change control, the searching section may perform a first resonance determination, and the equivalent reactance component setting section may perform an update process. The first change control by the phase changing section is a control in which the equivalent reactance component set by the equivalent reactance component setting section is changed in a first change pattern. The first resonance determination by the searching section is a process in which it is determined whether the behavior of change has become the resonance behavior when the first change control is performed by the phase changing section. The update process performed by the equivalent reactance component setting section is a process in which, when the behavior of change is determined to have become the resonance behavior in the first resonance determination performed by the searching section, the currently set equivalent reactance component is maintained, and when the behavior of change is determined not to have become the resonance behavior in the first resonance determination, the equivalent reactance component is updated so that the behavior of change becomes the resonance behavior based on a result of comparison between the behavior of change and the resonance behavior. The phase changing section may perform the first change control to the updated equivalent reactance component each time the update process is performed by the equivalent reactance component setting section. Furthermore, the searching section may perform the first resonance determination each time the update process is performed by the equivalent reactance component setting section.

That is, the compensation voltage is applied while changing the currently set equivalent reactance component in the first change pattern, and when the behavior of change at that time is not the resonance behavior, the value of the equivalent reactance component is updated. Then, the compensation voltage is applied again while changing the updated equivalent reactance component in the first change pattern, and when the behavior of change is still not the resonance behavior, the value of the equivalent reactance component is further updated. This is repeatedly performed, and the equivalent reactance component can thereby be converged toward an appropriate value (a value to cause resonance to occur).

For the first change pattern, sinusoidal change may be adopted, for example. Specifically, the phase changing section may perform the first change control by sinusoidally changing the equivalent reactance component set by the equivalent reactance component setting section, for at least one cycle. In this case, the searching section may calculate a first integral value, which is an integral value of the physical quantity in a first half cycle, and a second integral value, which is an integral value of the physical quantity in a second half cycle, at the time the equivalent reactance component is sinusoidally changed for one cycle by the first change control, and may determine that the behavior of change has become the resonance behavior in a case where the first integral value and the second integral value are in agreement with each other.

Such sinusoidal change can be applied comparatively easily. Moreover, by applying such sinusoidal change, the determination of whether the equivalent reactance component is set at an appropriate value can be performed appropriately and easily by comparison between the first integral value and the second integral value. Furthermore, it can be appropriately and easily determined in which direction the currently set equivalent reactance component should be shifted (i.e., whether the currently set equivalent reactance component should be increased or decreased) according to a difference between the first integral value and the second integral value.

The physical quantity detected by the physical quantity detecting section may include a second alternating current that is based on the alternating voltage outputted from the electric power receiving section, for example. Detection of the output current from the electric power receiving section is comparatively easy, and thus, it can be easily determined whether the electric power receiving device is in the substantially resonant state based on a result of detection of the output current.

The compensation voltage generating section may comprise a power detecting section configured to detect a power outputted from the converting section. In this case, the physical quantity detected by the physical quantity detecting section may include a power outputted from the converting section. Detection of the output power from the converting section is also comparatively easy, and thus, it can be easily determined whether the electric power receiving device is in the substantially resonant state based on a result of detection of the output power.

The compensation voltage generating section may be configured as follows. Specifically, the compensation voltage generating section may comprise the power detecting section and an equivalent resistance setting section that sets an equivalent resistance value in the converting section. The equivalent resistance setting section may set the equivalent resistance value so that the power detected by the power detecting section is in agreement with a target power set in advance. The compensation voltage calculating section may calculate the compensation voltage by a specified calculation that is based on the equivalent reactance component set by the equivalent reactance component setting section, the equivalent resistance value set by the equivalent resistance setting section, and the second alternating current detected by the current detecting section. The physical quantity detecting section may detect, as the physical quantity, the equivalent resistance value set by the equivalent resistance setting section.

The equivalent resistance value in the converting section is one of parameters that can control the output power outputted from the converting section. Thus, in the case where the output power is constant-controlled to be the target power, when the equivalent reactance component is changed, the equivalent resistance value is also changed to thereby control the output power to be constant. Consequently, by monitoring the equivalent resistance value, it can be determined whether the equivalent reactance component is set at an appropriate value (a value to bring the electric power receiving device into the substantially resonant state).

Calculation of the compensation voltage based on the equivalent reactance component may be performed as follows. Specifically, the phase changing section may perform a second change control in which the equivalent reactance component set by the equivalent reactance component setting section is changed in a second change pattern. The change in the second change pattern may include either of increasing the equivalent reactance component from a specified initial value or decreasing the equivalent reactance component from the initial value. The searching section may perform a second resonance determination in which it is determined whether the behavior of change at the time the second change control is performed has become the resonance behavior. The equivalent reactance component setting section may determine the equivalent reactance component at the time the behavior of change is determined to have become the resonance behavior in the second resonance determination as the equivalent reactance component to be set.

When the equivalent reactance component is changed, the compensation voltage to be generated is also changed, to thereby cause the physical quantity to change, too. Meanwhile, when the electric power receiving device is in the substantially resonant state, the behavior of change becomes the resonance behavior. Thus, an appropriate equivalent reactance component can be searched based on the physical quantity itself at the time the equivalent reactance component is changed.

Another aspect of embodiments of the present disclosure is a method of receiving electric power that comprises:

providing an electric power receiving device comprising an electric power receiving section and a converting section, the electric power receiving section comprising a pair of output terminals and a secondary coil to be electromagnetically coupled to a primary coil through which a first alternating current flows, the electric power receiving section being configured to output, via the pair of output terminals, an alternating voltage that is based on an induced electromotive force generated in the secondary coil, the converting section being configured to convert the alternating voltage outputted from the electric power receiving section into a direct voltage;

generating a compensation voltage having a frequency approximately equal to that of the alternating voltage and being capable of canceling out a reactance component in the electric power receiving section;

applying the generated compensation voltage between the pair of output terminals;

changing a phase of the compensation voltage in a specified change pattern;

detecting a specified physical quantity changed with change of the phase of the compensation voltage;

searching a target phase of the compensation voltage that brings the electric power receiving device into a substantially resonant state, based on the detected physical quantity; and determining the compensation voltage having the searched target phase as the compensation voltage to be applied between the pair of output terminals.

According to the method of receiving electric power as above, even when an inductance in the secondary coil is changed (and thus, the combined reactance in the electric power receiving section is changed) due to various factors, such as variations in characteristics of elements, temperature, and secular changes, resonance at a frequency of the alternating current flowing through the primary coil can be caused to occur easily and appropriately in the electric power receiving device as a whole.

In this method of receiving electric power, the searching the target phase of the compensation voltage may include searching the target phase that causes a behavior of change in the detected physical quantity to become a resonance behavior indicating that the electric power receiving device is in the substantially resonant state.

BRIEF DESCRIPTION OF THE DRAWINGS

Exemplary embodiments of the present disclosure will now be described by way of example with reference to the accompanying drawings, in which.

DETAILED DESCRIPTION OF THE PREFERRED EMBODIMENTS

First Embodiment (1) Outline of Electric Power Receiving Device 1

Figure 1:
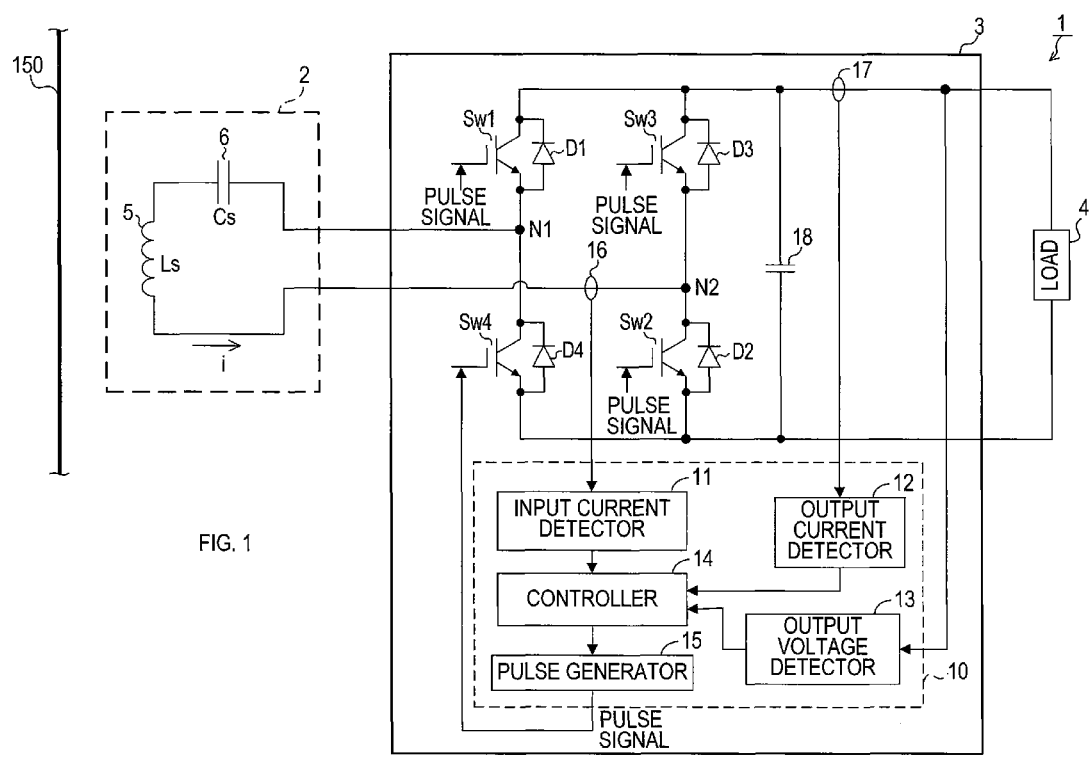
FIG. 1 is a configuration diagram showing a schematic configuration of an electric power receiving device of a first embodiment.

As shown in FIG. 1, an electric power receiving device 1 comprises an electric power receiving section 2 and a square-wave converter (hereinafter abbreviated as "converter") 3. The electric power receiving section 2 comprises a secondary coil 5 and a capacitor for resonance (hereinafter referred to as "resonance capacitor") 6. An inductance of the secondary coil 5 is represented by "Ls", and a capacitance of the resonance capacitor 6 is represented by "Cs". The secondary coil 5 is arranged facing a primary coil 150 located outside of the electric power receiving device 1, and is electromagnetically coupled to the primary coil 150. One end of the resonance capacitor 6 is connected to one end of the secondary coil 5, and the resonance capacitor 6 and the secondary coil 5 form a series resonance circuit.

The capacitance Cs of the resonance capacitor 6 has a value set such that a resonant frequency f of the series resonance circuit is in agreement with a frequency f of a high-frequency current flowing through the primary coil 150. In other words, the resonance capacitor 6 is provided so that a voltage of the overall series resonance circuit becomes zero (i.e., so that a combined reactance becomes zero) by compensating (canceling) a reactance voltage caused by an inductive reactance ωLs of the secondary coil 5. Here, w represents an angular frequency of the high-frequency current.

The inductance Ls of the secondary coil 5 and the capacitance Cs of the resonance capacitor 6 are designed such that the combined reactance is zero as described above, and an element used as the secondary coil 5 and an element used as the resonance capacitor 6 are selected based on such a design. However, various factors, such as variations in characteristics of the respective elements, a circuit configuration of the electric power receiving section 2 as a whole, an energizing current value, temperature changes, and secular changes, make it difficult to allow the combined reactance to actually become zero as designed. That is, the actual combined reactance in an induced current path in the electric power receiving section 2 does not become zero, and a reactance remains present. Such a reactance is referred to as a remaining reactance, and a value thereof is represented by "ωLr". "Lr" is referred to as a remaining reactance component.

The converter 3 comprises a first switch section Sw1, a second switch section Sw2, a third switch section Sw3, a fourth switch section Sw4, a control section 10, an input current sensor 16, an output current sensor 17, and a smoothing capacitor 18.

The switch sections Sw1 to Sw4 are each a semiconductor switching element having a self arc-extinguishing function, and an insulated gate bipolar transistor (IGBT) is used therefor in the present embodiment. However, it is just an example that the IGBT is used as each of the switch sections Sw1 to Sw4. Other semiconductor switching elements (e.g., MOSFET) may be used or switches of kinds other than the semiconductor switching element may be used.

The switch sections Sw1 to Sw4 form a pair of series-connected sections. One of the pair of series-connected sections is formed by series-connecting the first switch section Sw1 and the fourth switch section Sw4 to each other, more specifically, by connecting an emitter of the first switch section Sw1 and a collector of the fourth switch section Sw4 to each other. The other of the pair of series-connected sections is formed by series-connecting the third switch section Sw3 and the second switch section Sw2 to each other, more specifically, by connecting an emitter of the third switch section Sw3 and a collector of the second switch section Sw2 to each other. The pair of series-connected sections are connected in parallel to each other between both ends of a load 4.

Connected to a first node N1, which is an interconnection point between the emitter of the first switch section Sw1 and the collector of the fourth switch section Sw4, is the other end of the resonance capacitor 6 in the electric power receiving section 2. Connected to a second node N2, which is an interconnection point between the emitter of the third switch section Sw3 and the collector of the second switch section Sw2, is the other end of the secondary coil 5 in the electric power receiving section 2.

Diodes D1 to D4 are respectively connected between each emitter and each collector of the switch sections Sw1 to Sw4. The diodes D1 to D4 respectively absorb a counter electromotive force generated when the switch sections Sw1 to Sw4 are each turned OFF. The diodes D1 to D4 may each be a discrete element or may be a parasitic diode formed between each emitter and each collector of the switch sections Sw1 to Sw4.

The smoothing capacitor 18 is connected in parallel to the load 4. An alternating voltage inputted from the electric power receiving section 2 to the converter 3 is converted into a pulsating voltage by a conversion circuit including the switch sections Sw1 to Sw4, and the pulsating voltage is outputted toward the load 4. Such output from the conversion circuit is hereinafter also referred to as a conversion output. The smoothing capacitor 18 is provided in order to smooth the conversion output (pulsating voltage) from the conversion circuit and to generate a direct voltage.

The input current sensor 16 is a sensor capable of detecting an alternating input current (hereinafter, "I" represents an effective value of the input current, and "i" represents an instantaneous value of the input current) inputted from the electric power receiving section 2. The output current sensor 17 is a sensor that detects an output current of a direct current outputted to the load 4.

The control section 10 comprises an input current detector 11, an output current detector 12, an output voltage detector 13, a controller 14, and a pulse generator 15.

The input current detector 11 detects an input current i based on a detection signal inputted from the input current sensor 16, and further detects a current amplitude Im and a current phase θ of an input current i as will be described later, and outputs the detected amplitude Im and the phase θ to the controller 14. The output current detector 12 detects an output current outputted from the converter 3 to the load 4 based on a detection signal inputted from the output current sensor 17, and outputs the detected output current to the controller 14. The output voltage detector 13 detects an output voltage outputted from the converter 3 to the load 4, and outputs the detected output voltage to the controller 14.

The controller 14 calculates parameters required for switching each of the switch sections Sw1 to Sw4 such that a first switch pair including the first switch section Sw1 and the second switch section Sw2 and a second switch pair including the third switch section Sw3 and the fourth switch section Sw4 are turned ON and OFF alternately, as will be described later.

The pulse generator 15 generates pulse signals for turning each of the switch sections Sw1 to Sw4 ON and OFF based on various kinds of the parameters etc., calculated by the controller 14, and outputs the generated pulse signals to each of the switch sections Sw1 to Sw4. The converter 3 converts an alternating current (AC) power inputted from the electric power receiving section 2 into a direct current (DC) power through such switching, and outputs the DC power to the load 4. Along with this, the converter 3 generates a compensation voltage and applies the generated compensation voltage between input terminals (between the node N1 and the node N2) of the AC power from the electric power receiving section 2.

The compensation voltage is a voltage for canceling the reactance voltage caused by the remaining reactance ωLr (mainly, the combined reactance of the inductive reactance ωLs and a capacitive reactance 1/ωCs) in the electric power receiving section 2. As described above, the remaining reactance component Lr actually remains in the electric power receiving section 2. The remaining reactance component Lr is a factor that inhibits occurrence of resonance in the electric power receiving section 2. Thus, the converter 3 applies the compensation voltage to the electric power receiving section 2, and as a result, the remaining reactance component Lr is canceled out. Full resonance or a state close thereto is thereby created, and the maximum electric power can be obtained from the primary coil 150.

It is to be noted that, in the descriptions below, when "remaining reactance (remaining reactance component)" is referred to in connection with the electric power receiving section 2, it means a combined reactance made of the inductance Ls in the secondary coil 5 and the capacitance Cs in the resonance capacitor 6 unless otherwise noted, and that a reactance component generated due to factors (e.g., wiring) other than these two elements is to be ignored.

(2) Outline of Generation of Compensation Voltage

Figure 2A:
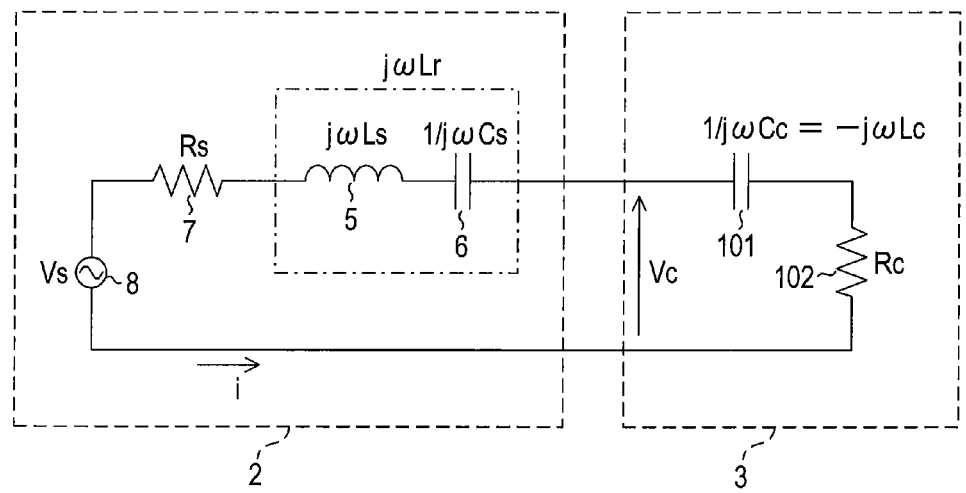
FIG. 2A shows an equivalent circuit of the electric power receiving device.

FIG. 2A shows an equivalent circuit of the electric power receiving device 1 of the present embodiment. As described above, the remaining reactance ωLr, which is the combined reactance made of the inductance Ls in the secondary coil 5 and the capacitance Cs in the resonance capacitor 6, is present in the electric power receiving section 2. In the electric power receiving section 2, a resistor 7 (a resistance value Rs) indicates a resistance component included in the secondary coil 5, and an alternating voltage source 8 indicates an induced voltage (hereinafter, "Vs" represents an effective value of the induced voltage, and "vs" represents an instantaneous value of the induced voltage) generated in the secondary coil 5.

As shown in FIG. 2A, the converter 3 can be equivalently indicated as a circuit configured with an equivalent resistor 102 (an equivalent resistance value Rc) and an equivalent reactance element 101 (a reactance component: −Lc) connected in series to each other. As is obvious from the equivalent circuit in FIG. 2A, if an absolute value Lc of the reactance component −Lc in the converter 3 (hereinafter referred to as a "reactance compensation amount") is equal to the remaining reactance component Lr in the electric power receiving section 2, the combined reactance in the overall equivalent circuit is jω(Lr−Lc)=0, and a fully resonant state can be obtained, in which the reactance component is zero.

Thus, in the present embodiment, a reactance compensation control is performed in which the converter 3 calculates a compensation voltage (hereinafter, "Vc" represents an effective value of the compensation voltage, and "vc" represents an instantaneous value of the compensation voltage) represented by a following formula (1) and applies the compensation voltage Vc to the electric power receiving section 2.

$$Vc = (Rc - j\omega Lc)I \qquad (1)$$

In the above formula (1), if Lc=Lr holds, the remaining reactance ωLr in the electric power receiving section 2 is canceled out and full resonance can be achieved. Thus, the converter 3 sets the reactance compensation amount Lc at a value equal to the remaining reactance component Lr and sets the equivalent resistance value Rc as appropriate. Then, the converter 3 calculates the compensation voltage Vc from these respective set values, and applies the compensation voltage Vc to the electric power receiving section 2. Application of the compensation voltage Vc represented by the formula (1) to the electric power receiving section 2 enables the remaining reactance ωLr in the electric power receiving section 2 to be canceled (to become zero) to achieve full resonance, as a result.

However, it is generally very difficult to accurately know the remaining reactance component Lr in the electric power receiving section 2. As described above, the actual remaining reactance component Lr varies depending on various factors, such as variations in characteristics of the respective elements, a circuit configuration of the electric power receiving section 2, an energizing current value, temperature changes, and secular changes.

Thus, in order to effectively perform the reactance compensation control, the converter 3 of the present embodiment performs a compensation amount search control in which an optimum reactance compensation amount Lc (a value equal to or very close to the remaining reactance component Lr) is searched, in the reactance compensation control. Then, the compensation voltage Vc represented by the above formula (1) is generated using the optimum reactance compensation amount Lc searched through the compensation amount search control, and the generated compensation voltage Vc is applied to the electric power receiving section 2.

The reactance compensation control and the compensation amount search control performed therein are both performed by the control section 10 in the converter 3. The reactance compensation amount Lc corresponds to an example of an equivalent reactance component of the present disclosure.

(3) Outline of Reactance Compensation Control

A specific explanation will be given of the reactance compensation control performed by the control section 10.

In a state where a high-frequency alternating voltage (e.g., 5 to 30 kHz) is applied to the primary coil 150 and a high-frequency alternating current is flowing therethrough, when the secondary coil 5 is brought to face the primary coil 150, the induced voltage (induced electromotive force) Vs is generated in the secondary coil 5. The induced voltage Vs causes the alternating current I to flow through the electric power receiving section 2. The alternating current I in the electric power receiving section 2 is inputted to the converter 3, and the instantaneous value i of the alternating current (input current) I is detected by the input current sensor 16. Specifically, the input current detector 11 detects the instantaneous value i based on a detection signal from the input current sensor 16. Then, the input current detector 11 calculates the current amplitude Im and the current phase θ based on the input current i.

Here, the instantaneous value i of the input current I detected by the input current sensor 16 is represented by a following formula (2).

$$i = Im \cdot \exp[j(\omega t + \theta)] \quad (2)$$

Im, t, and θ respectively represent the current amplitude, time, and the current phase, and exp is a symbol representing an exponential function.

The input current detector 11 calculates the current amplitude Im and the current phase θ based on the detected input current i. Methods of calculating the amplitude and the phase based on the instantaneous value i of the input current I are various, and how such calculation is specifically done may be decided as appropriate. One example of such calculation method is disclosed in the above-described Japanese Unexamined Patent Application Publication No. 2012-143135.

The calculation method disclosed in this publication is approximately as follows. First, the input current i is multiplied by each of a sine of the current phase θ (sin θ) and a cosine of the current phase θ (cos θ). Then, after a high-frequency component is removed from each of the multiplication results by a low-pass filter, each of the multiplication results is AD-converted. As a result, two digital data, i.e., X=(Im·sin θ)/2 and Y=(Im·cos θ)/2 can be obtained. Thus, the current amplitude Im and the current phase θ can be obtained by following formulae (3) and (4), respectively.

$$Im = 2(X^2 + Y^2)^{1/2} \quad (3)$$

$$\theta = \arctan(X/Y) \quad (4)$$

In this way, the current amplitude Im and the current phase θ can be calculated using the method disclosed in the above-described publication. It is needless to say that this method is just an example, and the current amplitude Im and the current phase θ may be calculated using other methods.

The controller 14 derives the equivalent resistance value Rc in the converter 3 and an optimum value of the reactance compensation amount Lc (a value to lead to a fully resonant state; specifically, a value equal to the remaining reactance component Lr) through the compensation amount search control. When the equivalent resistance value Rc in the converter 3 is set as appropriate and the optimum value of the reactance compensation amount Lc is obtained through the compensation amount search control, everything is in a state of preparedness for generating the compensation voltage Vc to be applied to the electric power receiving section 2 (see the formula (1)).

The compensation amount search control is performed based on some kinds of systems. Details of the compensation amount search control will be described later. The explanation here is continued on the assumption that the reactance compensation amount Lc and the equivalent resistance value Rc have been calculated through the compensation amount search control.

An amplitude Zm and a phase φ of an impedance Z in the converter 3 can be represented by following formulae (5) and (6) using the calculated reactance compensation amount Lc and equivalent resistance value Rc.

$$Zm = \{Rc^2 + (-\omega Lc)^2\}^{1/2} \quad (5)$$

$$\phi = \arctan\{(-\omega Lc)/Rc\} \quad (6)$$

The compensation voltage Vc (instantaneous value vc) that should be generated by the converter 3 can be represented by following formulae (7) and (8) using Zm and Φ, assuming that the amplitude and the phase of the compensation voltage Vc (instantaneous value vc) are Vm and Φ, respectively.

$$Vm = Zm \cdot Im \quad (7)$$

$$\Phi = \phi + \theta \quad (8)$$

That is, once the reactance compensation amount Lc and the equivalent resistance value Rc are calculated, the amplitude Zm and the phase φ of the impedance Z in the converter 3 are obtained by the above formulae (5) and (6) based on the reactance compensation amount Lc and the equivalent resistance value Rc. Then, once the amplitude Zm and the phase φ of the impedance Z are obtained, the compensation voltage vc that should be generated is obtained (specifically, the amplitude Vm and the phase Φ are obtained) by the above formulae (7) and (8) using the current amplitude Im and the current phase θ, too, calculated by the input current detector 11.

What kind of waveform the compensation voltage vc specifically should have when being generated is considered variously. In the present first embodiment, a pulsed voltage is generated as an example. Specifically, the controller 14 calculates the compensation voltage vc to be generated, by the above formulae (5) to (8), using the reactance compensation amount Lc and the equivalent resistance value Rc calculated through the compensation amount search control.

The pulse generator 15 performs switching of the respective switch sections Sw1 to Sw4 in order to generate the compensation voltage vc calculated by the controller 14. The pulse generator 15 generates pulse signals for switching the respective switch sections Sw1 to Sw4 so that the compensation voltage vc is generated between the node N1 and the node N2, and outputs the generated pulse signals to gates of the respective switch sections Sw1 to Sw4.

Due to such switching, a pulsed voltage actually having an amplitude Ed (equivalent to the compensation voltage Vc represented by the formula (1)) is to be applied between the node N1 and the node N2. The amplitude Ed is equal to an output voltage outputted from the converter 3 to the load 4. A DC power source that generates a voltage having the amplitude Ed may be separately connected in parallel to the load 4.

More specifically, the generation of the pulse signals for switching the respective switch sections Sw1 to Sw4 by the pulse generator 15 is performed based on an overlap angle β and an initial phase α inputted from the controller 14, which are pieces of information required for the generation of the pulse signals.

The controller 14 first calculates the overlap angle β by a following formula (9) based on the amplitude Vm and the phase Φ calculated by the above formulae (7) and (8).

$$\beta = \pi - \theta a \quad (9)$$

θa represents an ON-period for one pulse of the compensation voltage vc (i.e., duty ratio). θa is calculated by a following formula (10) based on the amplitude Vm of the compensation voltage vc calculated by the above formula (7) and the amplitude Ed.

$$\theta a = 2 \arcsin(Vm \cdot \pi / 4Ed) \quad (10)$$

Furthermore, the controller 14 calculates the initial phase α required for synchronization to a reference signal (the current phase θ) by a following formula (11).

$$\alpha = -\Phi + \beta/2 \quad (11)$$

The thus-calculated overlap angle β and initial phase α are inputted to the pulse generator 15. The pulse generator 15 performs switching of the respective switch sections Sw1 to Sw4 at a timing shown in FIG. 3 based on the overlap angle β and the initial phase α inputted from the controller 14.

Figure 3:
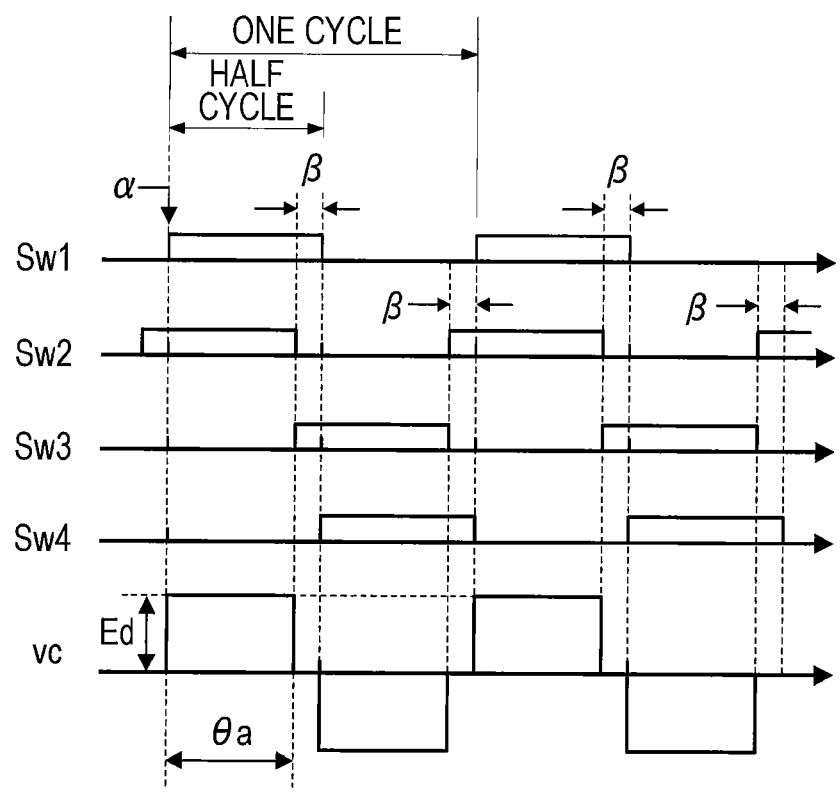
FIG. 3 is an explanatory diagram showing a specific example of switching of each of switch sections in a converter of the electric power receiving device.

First, an explanation will be given of switching of the first switch section Sw1 and the second switch section Sw2. As shown in FIG. 3, the first switch section Sw1 is turned ON at a timing in which a phase is shifted by the initial phase α with respect to a reference phase and is kept ON for a specified period of time (approximately π per cycle). Then, the first switch section Sw1 is turned OFF and kept OFF for the same period of time as such an ON-period. After that, such an operation is repeated periodically.

The second switch section Sw2 is turned ON at an earlier timing than that of the first switch section Sw1 by the overlap angle β. After being turned ON, the second switch section Sw2 is kept ON for the same period of time as the ON-period of the first switch section Sw1. That is, the second switch section Sw2 is turned OFF at an earlier timing than that of the first switch section Sw1 by the overlap angle β. An OFF-period of the second switch section Sw2 is the same in length as that of the first switch section Sw1. After that, such an operation is repeated periodically.

Because of the above-described respective timing gaps by the overlap angle β in turning the first switch section Sw1 and the second switch section Sw2 ON and OFF, a positive pulse of the compensation voltage vc is generated for a period of time ($\pi - \beta = \theta a$) from the time the first switch section Sw1 is turned ON to the time the second switch section Sw2 is turned OFF. Such a positive pulse is repeatedly generated periodically.

Next, an explanation will be given of switching of the third switch section Sw3 and the fourth switch section Sw4. As shown in FIG. 3, the third switch section Sw3 is operated in a completely inverse manner with the second switch section Sw2. That is, the third switch section Sw3 is kept OFF during the ON-period of the second switch section Sw2, and is kept ON during the OFF-period of the second switch section Sw2.

The fourth switch section Sw4 is operated in a completely inverse manner with the first switch section Sw1. That is, the fourth switch section Sw4 is kept OFF during the ON-period of the first switch section Sw1, and is kept ON during the OFF-period of the first switch section Sw1. To explain the timings of ON and OFF of the fourth switch section Sw4 in comparison with the timings of ON and OFF of the third switch section Sw3, the fourth switch section Sw4 is turned ON at a later timing than that of the third switch section Sw3 by the overlap angle β. Then, after being turned ON, the fourth switch section Sw4 is turned OFF after a lapse of the overlap angle β from the time the third switch section Sw3 is turned OFF.

Because of the above-described respective timing gaps by the overlap angle β in turning the third switch section Sw3 and the fourth switch section Sw4 ON and OFF, a negative pulse of the compensation voltage vc is generated for a period of time ($\pi - \beta = \theta a$) from the time the fourth switch section Sw4 is turned ON to the time the third switch section Sw3 is turned OFF. Such a negative pulse is repeatedly generated periodically.

As a result of the above-described switching of the respective four switch sections Sw1 to Sw4, the compensation voltage vc of a pulse shape having the amplitude Ed is generated as shown in the lowermost position in FIG. 3. Specifically, the positive pulse and the negative pulse are alternately generated periodically, and consequently, the compensation voltage vc represented by the above formulae (7) and (8) (the compensation voltage Vc represented by the above formula (1)) is applied between output terminals of the electric power receiving section 2 (applied between the node N1 and the node N2).

Because of the above-described application of the compensation voltage vc to the electric power receiving section 2, in the electric power receiving device 1, a state of "the reactance compensation amount Lc=the remaining reactance component Lr" is obtained in the equivalent circuit shown in FIG. 2A. That is, the remaining reactance component Lr in the electric power receiving section 2 is canceled out by the reactance compensation amount Lc in the converter 3, and the electric power receiving device 1 becomes a fully resonant state as a whole.

Thus, phases of an input current and an input voltage inputted from the electric power receiving section 2 to the converter 3 are in agreement with each other, to thereby enable the electric power receiving device 1 to be operated at a power factor of 1. The input current i inputted from the electric power receiving section 2 is converted into a direct current including a pulsating current by the above-described switching operation, and then, the converted direct current is smoothed by the smoothing capacitor 18. Then, the smoothed direct current is supplied to the load 4.

(4) Outline of Compensation Amount Search Control

Next, a specific explanation will be given of the compensation amount search control that is performed in the reactance compensation control, primarily in order to search the optimum value of the reactance compensation amount Lc. The compensation amount search control is performed as follows schematically. Specifically, the reactance compensation amount Lc is caused to change little by little within a specified range and in a specified variation pattern, and each time the reactance compensation amount Lc is changed, the converter 3 is operated (the compensation voltage vc is applied) with the changed reactance compensation amount Lc. Then, each time the converter 3 is operated with the changed reactance compensation amount Lc, a specified physical quantity is obtained that can be detected or calculated by the converter 3. Such a physical quantity is a physical quantity changed due to (in association with) the change of the reactance compensation amount Lc.

When the reactance compensation amount Lc is changed, the value of the obtained physical quantity is also changed with such change. On the other hand, depending on the physical quantity, it is possible to determine whether a fully resonant state has been achieved based on a behavior of change in the physical quantity. Thus, in the compensation amount search control, each time the reactance compensation amount Lc is changed, the compensation voltage vc based on the changed reactance compensation amount Lc is applied between the node N1 and the node N2, while the behavior of change in the physical quantity at the time the compensation voltage vc is applied is detected. When the behavior of change in the physical quantity has become a behavior of change caused in a fully resonant state (i.e., a behavior of change expected to occur when a fully resonant state has been achieved), the value of the reactance compensation amount Lc at that time is determined as the optimum reactance compensation amount Lc that should be searched.

Examples of the physical quantities that are changed when the reactance compensation amount Lc is changed include the input current i inputted from the electric power receiving section 2, an output power P outputted from the converter 3 to the load 4, and the equivalent resistance value Rc in the converter 3.

When the reactance compensation amount Lc is changed, a resonance point is shifted therewith, and thus, the input current i is also changed. Consequently, the optimum value of the reactance compensation amount Lc can be searched based on a behavior of change in the input current i at the time the reactance compensation amount Lc is changed.

When the reactance compensation amount Lc is changed, the resonance point is shifted therewith, and thus, the output power P is also changed. Consequently, the optimum value of the reactance compensation amount Lc can be searched based on a behavior of change in the output power P at the time the reactance compensation amount Lc is changed.

In a case where a control in which the output power P is always kept constant (power constant control) is performed, when the reactance compensation amount Lc is changed, the equivalent resistance value Rc is also changed. Consequently, the optimum value of the reactance compensation amount Lc can be searched based on a behavior of change in the equivalent resistance value Rc at the time the reactance compensation amount Lc is changed.

Whether the power constant control is to be employed can be determined as appropriate. However, when the output power P is used as a physical quantity, it is presupposed that the power constant control is not employed. In contrast, when the equivalent resistance value Rc is used as a physical quantity, it is presupposed that the power constant control is employed.

Specific methods (systems) for the compensation amount search control are various. In the present first embodiment, an explanation will be given of the compensation amount search control based on a full-time parameter detection system from among multiple kinds of methods. Other specific methods for the compensation amount search control include a full-time current detection system (with the power constant control), a full-time current detection system (without the power constant control), a full-time power detection system, and a startup-time current detection system. These respective other systems will be described later as second to fifth embodiments.

Figure 2B:
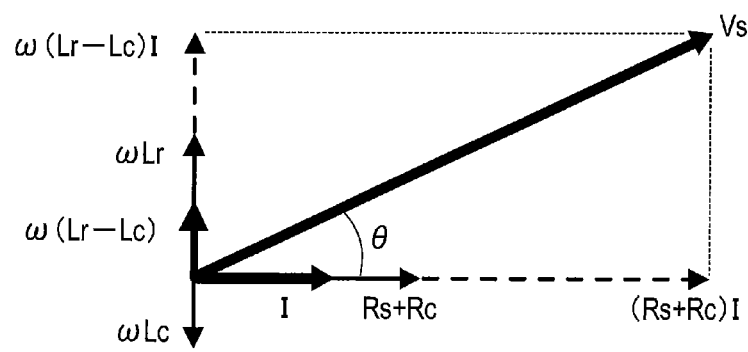
FIG. 2B shows a vector diagram of the equivalent circuit.

(5) Compensation Amount Search Control Based on Full-Time Parameter Detection System The equivalent circuit of the electric power receiving device 1 shown in FIG. 2A can be represented by a vector diagram as shown in FIG. 2B. A following formula (12) holds according to the vector diagram of FIG. 2B.

$$Vs = [\{\omega(Lr-Lc)I\}^2 + \{(Rs+Rc)I\}^2]^{1/2} \quad (12)$$
$$= I[\{\omega(Lr-Lc)\}^2 + (Rs+Rc)^2]^{1/2}$$

Thus, the input current I can be represented by a following formula (13).

$$I = Vs/[\{\omega(Lr-Lc)\}^2 + (Rs+Rc)^2]^{1/2} \quad (13)$$

Here, the induced voltage Vs, the resistance value Rs, and the remaining reactance component Lr shall all be constant values, and ω, which is represented by w=2πf, is a value fixed depending on the frequency f. Thus, ω shall also be constant.

The output power P from the converter 3 can be represented by a following formula (14).

$$P = Rc \cdot I^2 \quad (14)$$

The output power P can be represented by a following formula (15) by introducing the formula (13) into the above formula (14).

$$P = Vs^2 \cdot Rc/[\{\omega(Lr-Lc)\}^2 + (Rs+Rc)^2] \quad (15)$$

Figure 4A:
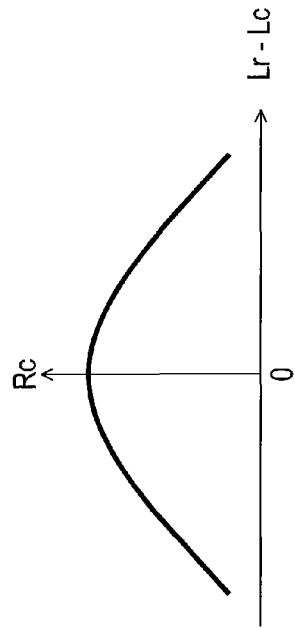
FIGS. 4A and 4B are explanatory diagrams illustrating a compensation amount search control based on a full-time parameter detection system of the first embodiment.

In the present first embodiment, the output power P is controlled to be constant because the power constant control is employed. Specifically, the controller 14 adjusts the equivalent resistance value Rc so that the output power P is kept constant. Thus, in the formula (15), when a term (Lr−Lc) is changed due to a change of the reactance compensation amount Lc, the equivalent resistance value Rc is changed as shown in FIG. 4A in order to keep the output power P constant. It is to be noted that FIG. 4A is a conceptual diagram that schematically shows a change tendency of the equivalent resistance value Rc with respect to the change of the term (Lr−Lc), and that the change of the equivalent resistance value Rc is not necessarily indicated accurately.

It is seen from FIG. 4A that the closer to zero the term (Lr−Lc) is, i.e., the closer to 1 the power factor is, the larger the equivalent resistance value Rc is. Based on such a tendency in which the closer to 1 the power factor is, the larger the equivalent resistance value Rc is, it is derived, from the formula (14), that the closer to 1 the power factor is (i.e., the larger the equivalent resistance value Rc is), the smaller the input current I is, under the power constant control.

That is, when the compensation amount search control is performed while performing the power constant control, the closer to 1 the power factor is, the more increased the equivalent resistance value Rc is and, in contrast, the more decreased the input current I is. The equivalent resistance value Rc can be considered as a power control parameter because the output power P can be adjusted by adjusting the equivalent resistance value Rc.

Thus, in the present first embodiment, the compensation voltage vc is generated and applied while changing the reactance compensation amount Lc. Then, the behavior of change in the equivalent resistance value Rc, which is one of parameters for operation of the converter 3, is monitored. When the behavior of change in the equivalent resistance value Rc has become the behavior of change caused in a fully resonant state, the value of the reactance compensation amount Lc at that time is determined as the optimum reactance compensation amount Lc that should be set ultimately. This is an outline of the compensation amount search control based on the full-time parameter detection system of the present first embodiment.

Specifically, the compensation amount search control based on the full-time parameter detection system is performed as follows. First, the reactance compensation amount Lc is set at a certain reference value (initial value) Lco. Then, a sinusoidal disturbance (corresponding to an example of a first change pattern of the present disclosure) for at least one cycle is applied to the reactance compensation amount Lc set at the reference value Lco. That is, the reactance compensation amount Lc is sinusoidally changed. It is to be noted that to change the reactance compensation amount Lc means to change a phase of the compensation voltage vc generated based on the reactance compensation amount Lc.

In the case where the sinusoidal disturbance is applied to the reactance compensation amount Lc, a disturbance-applied compensation amount Lcn, which is a reactance compensation amount to which the disturbance has been applied, is represented by a following formula (16).

$$Lcn = Lc + \sin(n \cdot 2\pi/N) \quad (16)$$

In the above formula (16), n represents a natural number (n=1, 2, 3, . . . ), and N is a total count that causes the reactance compensation amount to change in one sine wave cycle.

Thus, in the case where the reactance compensation amount Lc is set at a certain value, to apply the sinusoidal disturbance to the reactance compensation amount Lc involves following steps.

First, the reactance compensation amount Lc and the equivalent resistance value Rc are each set at the initial values, and the compensation voltage vc is calculated based on these initial values and the input current i. Then, the calculated compensation voltage vc is actually applied to the electric power receiving section 2.

Upon application of the compensation voltage vc, an output current and an output voltage at that time are detected, and the output power P is calculated based on the detected values. Then, the output power P and a target power Po set in advance are compared with each other, and the equivalent resistance value Rc, which is a power control parameter, is corrected so that the output power P is in agreement with the target power Po. The corrected equivalent resistance value Rc is stored in a memory. Furthermore, detection of the input current i and application of the disturbance to the reactance compensation amount Lc are also performed. Specifically, a disturbance-applied compensation amount Lc1=Lc+sin(2π/N) is obtained by the formula (16) under assumption of n=1, to begin with. Then, the compensation voltage vc is calculated based on the detected input current i, the disturbance-applied compensation amount Lc1, and the corrected equivalent resistance value Rc, and the calculated compensation voltage vc is actually generated and applied to the electric power receiving section 2.

Each time the compensation voltage vc is calculated and applied, correction of the equivalent resistance value Rc and change of the reactance compensation amount Lc are performed through a process similar to the above. Specifically, after the compensation voltage vc is calculated under assumption of n=1 and the calculated compensation voltage vc is applied as described above, an output current and an output voltage at that time are detected, and the output power P is calculated based on the detected values. Then, the output power P and the target power Po set in advance are compared with each other, and the equivalent resistance value Rc is corrected so that the output power P is in agreement with the target power Po. The corrected equivalent resistance value Rc is stored in the memory. Furthermore, detection of the input current i and application of the disturbance to the reactance compensation amount Lc are also performed. Specifically, a disturbance-applied compensation amount Lc2=Lc+sin(2·2π/N) is obtained by the formula (16) under assumption of n=2 (i.e., with n being incremented by 1). Then, the compensation voltage vc is calculated based on the detected input current i, the disturbance-applied compensation amount Lc2, and the corrected equivalent resistance value Rc, and the calculated compensation voltage vc is actually generated and applied to the electric power receiving section 2.

After that, too, each time a compensation voltage vc is applied, detection of the input current i, correction and storage of the equivalent resistance value Rc, update of the disturbance-applied compensation amount Lcn by incrementing n, and the like are performed to thereby recalculate (update) the compensation voltage vc. Then, the compensation voltage vc to be applied to the electric power receiving section 2 is changed over to the updated compensation voltage vc. This is repeatedly performed from n=1 to n=N. In this way, the sinusoidal disturbance for one cycle is applied to the currently set reactance compensation amount Lc. In addition, the equivalent resistance value Rc (change of the equivalent resistance value Rc) for one sine wave cycle in the process of sinusoidal change of the reactance compensation amount Lc is also obtained.

Each time the sinusoidal disturbance for one cycle is applied to the currently set reactance compensation amount Lc as described above, an integral value (area) A of the equivalent resistance value Rc in the first half cycle and an integral value (area) B of the equivalent resistance value Rc in the second half cycle are compared with each other. It is to be noted that the integral value (area) referred to here is a summation (summation in each half cycle) of each equivalent resistances value Rc, stored in the memory, for each disturbance-applied compensation amount Lcn.

Supposing that "the currently set reactance compensation amount Lc=the remaining reactance component Lr" has already been achieved, i.e., in a case where a resonant state has been already achieved, whether the value of the reactance compensation amount Lc is caused to increase or decrease, a difference from the remaining reactance component Lr becomes larger in either case, and the whole electric power receiving device 1 becomes less resonant.

Figure 4B:
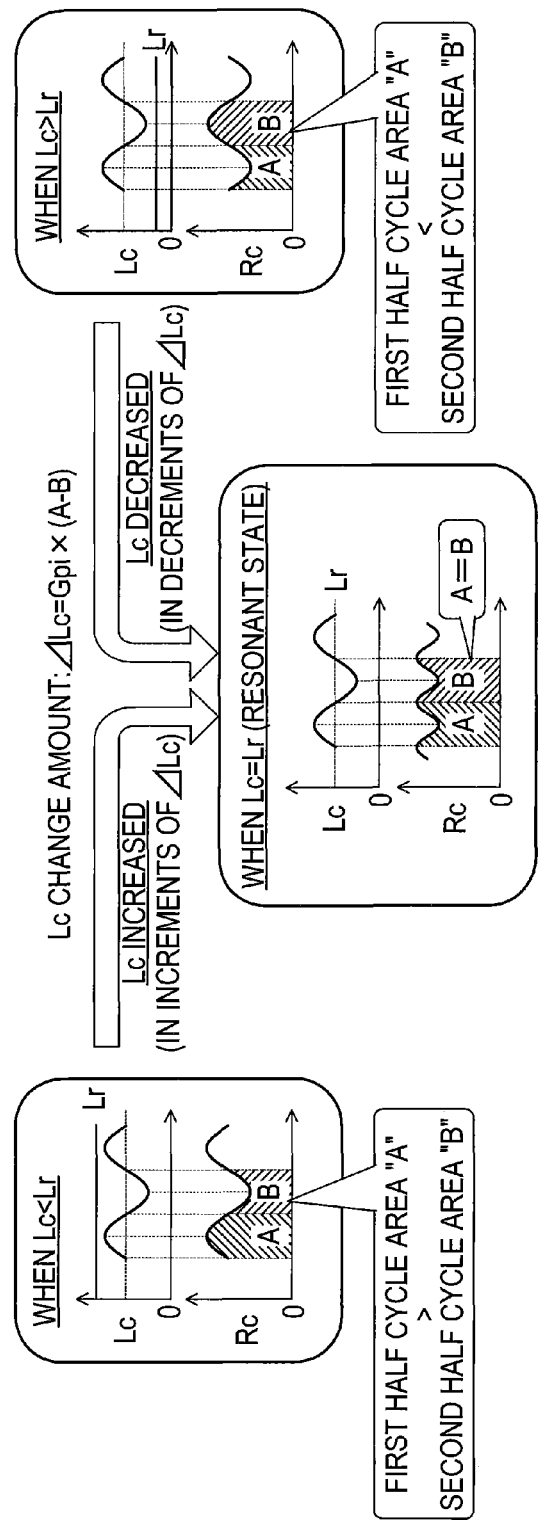

Thus, in the case where a resonant state has been already achieved, i.e., "the reactance compensation amount Lc=the remaining reactance component Lr" holds, the equivalent resistance value Rc in the first half cycle in the case where the reactance compensation amount Lc is sinusoidally changed becomes smaller as the reactance compensation amount Lc is increased to be away from the remaining reactance component Lr, and becomes larger again as the reactance compensation amount Lc is then decreased to be closer to the remaining reactance component Lr, as illustrated in the center of FIG. 4B. The equivalent resistance value Rc in the second half cycle becomes smaller as the reactance compensation amount Lc is decreased to be away from the remaining reactance component Lr, and becomes larger again as the reactance compensation amount Lc is then increased to be closer to the remaining reactance component Lr. The equivalent resistance value Rc becomes the maximum value when "the reactance compensation amount Lc=the remaining reactance component Lr" holds, and the equivalent resistance value Re becomes smaller as a difference between the reactance compensation amount Lc and the remaining reactance component Lr becomes larger.

Thus, in the case where "the reactance compensation amount Lc=the remaining reactance component Lr" has already been achieved, the area A of the equivalent resistance value Rc in the first half cycle and the area B of the equivalent resistance value Rc in the second half cycle at the time the reactance compensation amount Lc is sinusoidally changed for one cycle are the same as each other (A=B).

On the other hand, in a case where the currently set reactance compensation amount Lc is smaller than the remaining reactance component Lr (Lc<Lr), when the sinusoidal disturbance is applied to the currently set reactance compensation amount Lc, the equivalent resistance value Rc is changed as illustrated in the left side of FIG. 4B. Specifically, as the reactance compensation amount Lc is increased, the reactance compensation amount Lc gets closer to the remaining reactance component Lr (i.e., the electric power receiving section 2 becomes closer to a resonant state), and thus, the equivalent resistance value Rc becomes increased. In contrast, as the reactance compensation amount Lc is decreased, the reactance compensation amount Lc gets away from the remaining reactance component Lr, and thus, the equivalent resistance value Rc becomes decreased.

Consequently, when "the reactance compensation amount Lc<the remaining reactance component Lr" holds, the area A of the equivalent resistance value Rc in the first half cycle and the area B of the equivalent resistance value Rc in the second half cycle in the case where the reactance compensation amount Lc is sinusoidally changed for one cycle are different from each other, and "the area A>the area B" holds. In other words, the integration result for one cycle, i.e., "the area A>the area B", indicates that the currently set reactance compensation amount Lc is smaller than the actual remaining reactance component Lr.

Thus, in the present first embodiment, as a result of applying the sinusoidal disturbance for one cycle to the currently set reactance compensation amount Lc, if the area A of the equivalent resistance value Rc in the first half cycle is larger than the area B of the equivalent resistance value Rc in the second half cycle, a set value of the reactance compensation amount Lc is updated to a value larger than the currently set value. Specifically, a change amount ΔLc by which the reactance compensation amount Lc is to be changed is calculated by multiplying an area difference (A−B) between the area A and the area B by a specified gain Gpi, for example. Then, the reactance compensation amount Lc is newly calculated by adding the calculated change amount ΔLc to the currently set reactance compensation amount Lc.

How the currently set reactance compensation amount Lc is specifically to be increased based on the area difference (A−B) is not limited to the above method, and various methods can be employed. For example, it may be possible to update the reactance compensation amount Lc by calculating the change amount ΔLc with respect to the reference value Lco based on the currently set reactance compensation amount Lc and the area difference (A−B) and by adding the calculated change amount ΔLc to the reference value Lco. Besides that, a method of calculating and updating the reactance compensation amount Lc based on the area difference (A−B) can be determined as appropriate, as long as the reactance compensation amount Lc can be updated adequately (as long as the reactance compensation amount Lc can be brought closer to the actual remaining reactance component Lr).

The thus-updated new reactance compensation amount Lc should have got closer to the actual remaining reactance component Lr as long as "the reactance compensation amount Lc>the remaining reactance component Lr" does not hold.

Subsequently, the sinusoidal disturbance for one cycle is applied again to the updated new reactance compensation amount Lc, and the integral value (the area A) of the equivalent resistance value Rc in the first half cycle and the integral value (the area B) of the equivalent resistance value Rc in the second half cycle are compared with each other. Then, the change amount ΔLc is calculated based on the area difference (A−B) similarly to the above, and the reactance compensation amount Lc is updated. As long as "the area A>the area B" continues to hold, the reactance compensation amount Lc is caused to gradually increase (in increments of the change amount ΔLc) to thereby cause the value of the reactance compensation amount Lc to come to reach the remaining reactance component Lr.

On the other hand, in a case where the currently set reactance compensation amount Lc is larger than the remaining reactance component Lr (Lc>Lr), when the sinusoidal disturbance is applied to the currently set reactance compensation amount Lc, the equivalent resistance value Rc is changed as illustrated in the right side of FIG. 4B. Specifically, as the reactance compensation amount Lc is increased, the reactance compensation amount Lc gets away from the remaining reactance component Lr (i.e., the whole electric power receiving device 1 becomes a less resonant state), and thus, the equivalent resistance value Rc becomes decreased. In contrast, as the reactance compensation amount Lc is decreased, the reactance compensation amount Lc gets closer to the remaining reactance component Lr, and thus, the equivalent resistance value Rc becomes increased.

Consequently, when "the reactance compensation amount Lc>the remaining reactance component Lr" holds, the area A of the equivalent resistance value Rc in the first half cycle and the area B of the equivalent resistance value Rc in the second half cycle in the case where the reactance compensation amount Lc is sinusoidally changed for one cycle are different from each other, and "the area A<the area B" holds. In other words, the integration result for one cycle, i.e., "the area A<the area B", indicates that the currently set reactance compensation amount Lc is larger than the actual remaining reactance component Lr.

Thus, in the present first embodiment, as a result of applying the sinusoidal disturbance for one cycle to the currently set reactance compensation amount Lc, if the area A of the equivalent resistance value Rc in the first half cycle is smaller than the area B of the equivalent resistance value Rc in the second half cycle, the set value of the reactance compensation amount Lc is updated to a value smaller than the currently set value. Specifically, the change amount ΔLc by which the reactance compensation amount Lc is to be changed is calculated by multiplying the area difference (A−B) by a specified gain Gpi, similarly to the case of "the area A>the area B". Then, the reactance compensation amount Lc is newly calculated by subtracting the calculated change amount ΔLc from the currently set reactance compensation amount Lc. In a case where a positive value is calculated as the change amount ΔLc, it is only required to subtract the change amount ΔLc from the currently set reactance compensation amount Lc, and in a case where a negative value is calculated as the change amount ΔLc, it is only required to add the change amount ΔLc to the currently set reactance compensation amount Lc. In either case, as a result, the reactance compensation amount Lc is updated to be smaller than the currently set reactance compensation amount Lc.

The thus-updated new reactance compensation amount Lc should have got closer to the actual remaining reactance component Lr as long as "the reactance compensation amount Lc<the remaining reactance component Lr" does not hold.

Subsequently, the sinusoidal disturbance for one cycle is applied again to the updated new reactance compensation amount Lc, and the integral value (the area A) of the equivalent resistance value Rc in the first half cycle and the integral value (the area B) of the equivalent resistance value Rc in the second half cycle are compared with each other. Then, the change amount ΔLc is calculated based on the area difference (A−B) similarly to the above, and the reactance compensation amount Lc is updated. As long as "the area A<the area B" continues to hold, the reactance compensation amount Lc is caused to gradually decrease (in decrements of the change amount ΔLc) to thereby cause the reactance compensation amount Lc to come to reach the remaining reactance component Lr.

As described above, in the compensation amount search control based on the full-time parameter detection system, the sinusoidal disturbance is applied to the currently set reactance compensation amount Lc; the integral value (the area A) of the equivalent resistance value Rc in the first half cycle and the integral value (the area B) in the second half cycle are compared with each other; and the reactance compensation amount Lc is increased in increments of the change amount ΔLc when "the area A>the area B" holds, or in contrast, the reactance compensation amount Lc is decreased in decrements of the change amount ΔLc when "the area A<the area B" holds, to thereby bring the reactance compensation amount Lc to be in agreement with the actual remaining reactance component Lr. Then, when "the area A=the area B" is achieved, the reactance compensation amount Lc is assumed to be in agreement with the actual remaining reactance component Lr, and the compensation voltage vc is generated using the currently set reactance compensation amount Lc, and the generated compensation voltage vc is applied.

Through the above-described compensation amount search control based on the full-time parameter detection system, the optimum value of the reactance compensation amount Lc is searched and the compensation voltage vc based on the optimum reactance compensation amount Lc is applied to the electric power receiving section 2, to thereby make it possible, even when the remaining reactance component Lr is present in the electric power receiving section 2, to cancel out such remaining reactance component Lr to allow the electric power receiving device 1 to be in a resonant state (full resonance or a state close thereto) as a whole. Such application of the compensation voltage vc enables the phases of the current and the voltage inputted from the electric power receiving section 2 to the converter 3 to be in agreement with each other, and the electric power receiving device 1 can be operated at a power factor of 1.

Here, an explanation will be given, with reference to FIG. 4C, about a configuration of a parameter calculating section 20 provided in the controller 14 to perform the compensation amount search control based on the full-time parameter detection system. The controller 14 primarily has a function of performing the compensation amount search control based on the full-time parameter detection system, and a function of calculating the compensation voltage vc based on the reactance compensation amount Lc and the equivalent resistance value Rc set by such a compensation amount search function and on the current amplitude Im and the current phase θ detected by the input current detector 11. From among the two functions, the function of performing the compensation amount search control based on the full-time parameter detection system is fulfilled by the parameter calculating section 20 provided in the controller 14.

Figure 4C:
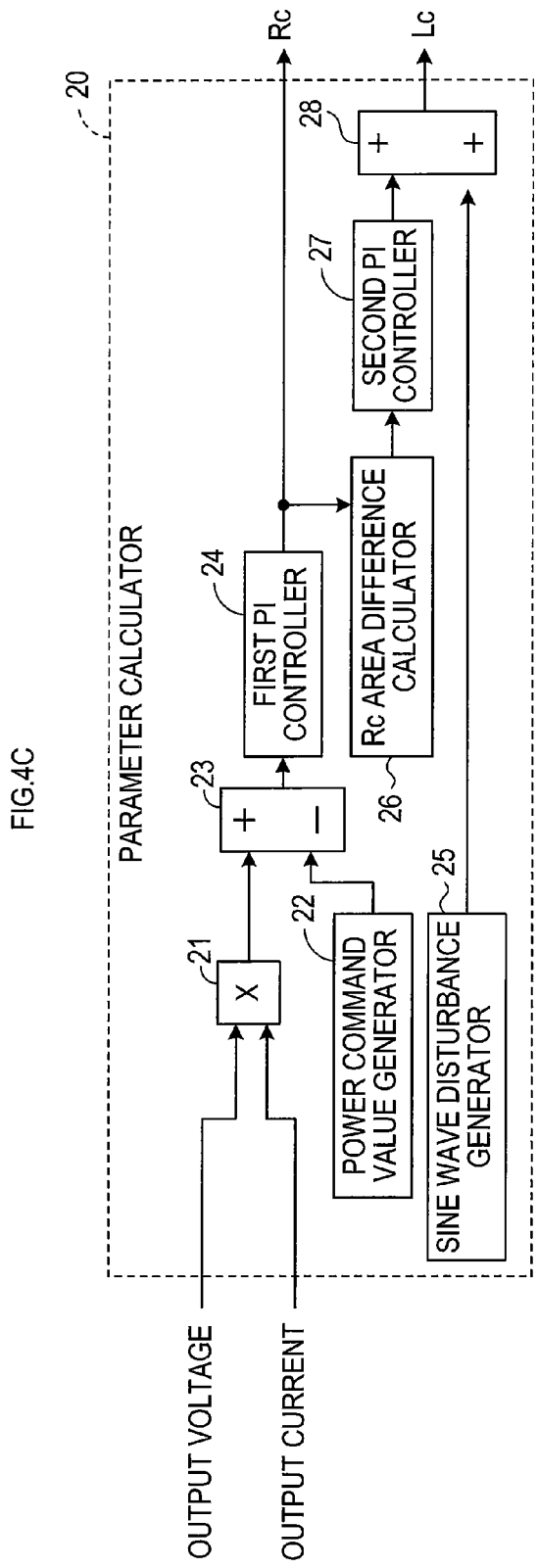
FIG. 4C is a block diagram showing a configuration of a parameter calculating section that performs the compensation amount search control of the first embodiment.

As shown in FIG. 4C, the parameter calculating section 20 comprises a multiplier 21, a power command value generator 22, a subtracter 23, a first PI controller 24, a sine wave disturbance generator 25, an Rc area difference calculator 26, a second PI controller 27, and an adder 28.

The multiplier 21 multiplies the output current detected by the output current detector 12 by the output voltage detected by the output voltage detector 13, to thereby calculate the output power P. The power command value generator 22 generates the target power Po, which is a target value of the output power P. The subtracter 23 subtracts the target power Po from the output power P (the actual output power) calculated by the multiplier 21, to thereby calculate a difference (power deviation) between the output power P and the target power Po. The first PI controller 24 corrects the equivalent resistance value Rc based on the power deviation calculated by the subtracter 23 so that the power deviation becomes zero. In the present first embodiment, the power constant control is performed as described above. The first PI controller 24 is a functional block for performing the power constant control.

The sine wave disturbance generator 25 generates a sine wave signal. Each time the sinusoidal disturbance for one cycle is applied to the currently set reactance compensation amount Lc, the Rc area difference calculator 26 calculates an Rc area difference, which is a difference between the area A of the equivalent resistance value Rc in the first half cycle and the area B of the equivalent resistance value Rc in the second half cycle, in that one cycle.

Each time the sinusoidal disturbance for one cycle is applied to the currently set reactance compensation amount Lc, the second PI controller 27 updates the reactance compensation amount Lc based on the Rc area difference calculated by the Rc area difference calculator 26 so that the Rc area difference becomes zero.

Each time the reactance compensation amount Lc is updated by the second PI controller 27, the adder 28 applies the sinusoidal disturbance to the updated new reactance compensation amount Lc based on the sine wave signal from the sine wave disturbance generator 25. Specifically, as explained using the formula (16), the disturbance-applied compensation amount Lcn is generated sequentially (generated in the total number of N in one cycle) in accordance with the sine wave signal.

A specific method of applying the sinusoidal disturbance to the reactance compensation amount Lc is not limited to the method in which the adder 28 is used. To apply the sinusoidal disturbance using the calculation shown in the above formula (16) is also just an example. The sinusoidal disturbance may be applied neither by the disturbance application using the above formula (16) nor by the disturbance application using the adder 28, but by other various calculation methods. The amplitude of the disturbance (the amplitude of the sine wave, in the present example) can also be determined as appropriate.

Each time the disturbance-applied compensation amount Lcn is generated by the adder 28 (i.e., each time the currently set reactance compensation amount Lc is sinusoidally changed from the disturbance-applied compensation amount Lc1 to a disturbance-applied compensation amount LcN), the compensation voltage vc is calculated based on the generated disturbance-applied compensation amount Lcn, the equivalent resistance value Rc at that time, and the input current i at that time, and the calculated compensation voltage vc is applied to the electric power receiving section 2. Then, the output power P at that time is calculated by the multiplier 21, and the equivalent resistance value Rc is newly corrected by the first PI controller 24 based on a difference between the output power P and the target power Po. That is, each time the disturbance-applied compensation amount Lcn is sinusoidally changed from the disturbance-applied compensation amount Lc1 to the disturbance-applied compensation amount LcN, the equivalent resistance value Rc is corrected. Then, each time the equivalent resistance value Rc is calculated, the calculated equivalent resistance value Rc is stored in a memory in the Rc area difference calculator 26, and the stored equivalent resistance value Rc is used for integration (area calculation).

After the disturbance application for one sine wave cycle to the currently set reactance compensation amount Lc by the adder 28 is finished, the reactance compensation amount Lc is calculated and updated by the second PI controller 27 based on the Rc area difference calculated by the Rc area difference calculator 26. At such a time, if the Rc area difference is zero, the currently set value of the reactance compensation amount Lc is maintained as it is, as described above. On the other hand, if the Rc area difference is positive (the area A>the area B), the reactance compensation amount Lc is updated to a value larger than the currently set value, and if the Rc area difference is negative (the area A<the area B), the reactance compensation amount Lc is updated to a value smaller than the currently set value. After the reactance compensation amount Lc is updated (or maintained as it is) in such a manner, the sinusoidal disturbance for one cycle is applied again to the updated new reactance compensation amount Lc by the adder 28, similarly to the above. Then, the reactance compensation amount Lc is further calculated and updated according to the Rc area difference in that one cycle. Due to such calculation and update being performed repeatedly, the reactance compensation amount Lc comes to reach the optimum value (a value equal to the actual remaining reactance component Lr).

The converter 3 constantly performs the compensation amount search control based on the full-time parameter detection system as long as the converter 3 is running. Because of such a constant performance while the converter 3 is running, even if the remaining reactance component Lr of the electric power receiving section 2 is varied while the converter 3 is running, the reactance compensation amount Lc can be adjusted to the optimum value constantly, following such variation. This makes it possible to maintain a fully resonant state (or a state close thereto) constantly while the converter 3 is running. The same applies to the respective compensation amount search controls in the second to fourth embodiments to be described later, which are performed constantly while the converter 3 is running.

(6) Effects of First Embodiment

As described above, in the electric power receiving device 1 of the present first embodiment, the phase of the compensation voltage vc is changed by application of the sinusoidal disturbance to the reactance compensation amount Lc, and then, based on the behavior of change in the equivalent resistance value Rc at the time of such change, the optimum value of the reactance compensation amount Lc is searched. Thus, even when the remaining reactance component Lr in the electric power receiving section 2 is changed due to various factors, the compensation voltage vc suitable for the actual remaining reactance component Lr can be applied to the electric power receiving section 2.

That is, according to the electric power receiving device 1 of the present first embodiment, even when the inductance Ls of the secondary coil 5 is changed (and thus, the remaining reactance component Lr in the electric power receiving section 2 is changed) due to various factors, such as variations in characteristics of elements, temperature, and secular changes, resonance at a frequency of the alternating current flowing through the primary coil 150 can be caused to occur easily and appropriately in the electric power receiving device 1 as a whole.

Particularly, in the present first embodiment, the compensation voltage vc is generated and applied while changing the currently set reactance compensation amount Lc sinusoidally, and the integral value (the area A) of the equivalent resistance value Rc in the first half cycle and the integral value (the area B) of the equivalent resistance value Rc in the second half cycle in one sine wave cycle are calculated. Then, the area A and the area B are compared with each other to thereby determine whether resonance has occurred. In a case where the area A and the area B are different from each other, the reactance compensation amount Lc is updated to become an appropriate value according to the difference between these areas. Thus, the optimum value of the reactance compensation amount Lc can be calculated easily and with a high degree of accuracy.

Moreover, in the present first embodiment, the power constant control is employed, and in such a case, when the reactance compensation amount Lc is changed (and thus, the compensation voltage vc is changed), the equivalent resistance value Rc is also changed correspondingly. Thus, the optimum value of the reactance compensation amount Lc can be searched appropriately by using the equivalent resistance value Rc as a physical quantity.

Second Embodiment

In the above-described first embodiment, the compensation amount search control based on the full-time parameter detection system has been explained by way of example as a specific method for the compensation amount search control. In the present second embodiment, an explanation will be given of the compensation amount search control based on the full-time current detection system (with the power constant control), which is one of specific methods for the compensation amount search control.

In the compensation amount search control based on the full-time current detection system (with the power constant control), too, a sinusoidal disturbance is applied to the reactance compensation amount Lc. However, while the equivalent resistance value Rc is integrated in each half cycle in the first embodiment, in the present second embodiment, the input current i is integrated in each half cycle. Then, the reactance compensation amount Lc is calculated and updated based on a difference between the integral values (areas) in the respective half cycles.

As explained using FIG. 4A and the formula (14), under the power constant control, the closer to zero the term (Lr−Lc) is, i.e., the closer to 1 the power factor is, the larger the equivalent resistance value Rc is, and the smaller the input current I is.

Thus, in the present second embodiment, the equivalent resistance value Rc is adjusted so that the output power P is kept constant while changing the reactance compensation amount Lc, and change of the input current i is monitored. When the behavior of change in the input current i is the behavior of change caused in a fully resonant state, the value of the reactance compensation amount Lc at that time is determined as the optimum reactance compensation amount Lc that should be set ultimately. This is an outline of the compensation amount search control based on the full-time current detection system (with the power constant control) of the present second embodiment.

Specifically, the compensation amount search control based on the full-time current detection system (with the power constant control) is performed as follows. First, the reactance compensation amount Lc is set at a certain reference value (initial value) Lco. Then, the sinusoidal disturbance for at least one cycle is applied to the reactance compensation amount Lc set at the reference value Lco. That is, the reactance compensation amount Lc is sinusoidally changed.

Application of the sinusoidal disturbance to the reactance compensation amount Lc is performed similarly to the first embodiment. That is, the reactance compensation amount Lc is changed as explained using the formula (16) in the first embodiment. Specifically, the following steps are to be taken.

First, the reactance compensation amount Lc and the equivalent resistance value Rc are each set at the initial values, and the compensation voltage vc is calculated based on these initial values and the input current i. Then, the calculated compensation voltage vc is actually applied to the electric power receiving section 2.

Upon application of the compensation voltage vc, the input current i is detected and a value thereof is stored in the memory. That is, in the present second embodiment, the controller 14 obtains the value of the input current i itself in addition to the current amplitude Im and the current phase θ from the input current detector 11, and stores them in the memory.

Moreover, an output current and an output voltage are detected, and the output power P is calculated based on the detected values. Then, the output power P and the target power Po are compared with each other, and the equivalent resistance value Rc, which is a power control parameter, is corrected so that the output power P is in agreement with the target power Po.

Furthermore, application of the disturbance to the reactance compensation amount Lc is performed. Specifically, the disturbance-applied compensation amount Lc1=Lc+sin(2π/N) is obtained by the formula (16) under assumption of n=1, to begin with. Then, the compensation voltage vc is calculated based on the detected input current i, the disturbance-applied compensation amount Lc1, and the corrected equivalent resistance value Rc, and the calculated compensation voltage vc is actually generated and applied to the electric power receiving section 2.

Each time the compensation voltage vc is calculated and applied, detection and storage of the input current i, correction of the equivalent resistance value Rc, and change of the reactance compensation amount Lc are performed through the process similar to the above. Specifically, after the compensation voltage vc is calculated under assumption of n=1 and the calculated compensation voltage vc is applied as described above, the input current i at that time is detected and stored in the memory. Moreover, an output current and an output voltage are detected, and the output power P is calculated based on the detected values. Then, the output power P and the target power Po set in advance are compared with each other, and the equivalent resistance value Rc is corrected so that the output power P is in agreement with the target power Po. Then, application of the disturbance to the reactance compensation amount Lc is performed again. Specifically, the disturbance-applied compensation amount Lc2=Lc+sin(2·2π/N) is obtained by the formula (16) under assumption of n=2 (i.e., with n being incremented by 1). Then, the compensation voltage vc is calculated based on the detected input current i, the disturbance-applied compensation amount Lc2, and the corrected equivalent resistance value Rc, and the calculated compensation voltage vc is actually generated and applied to the electric power receiving section 2.

After that, too, each time the compensation voltage vc is applied, detection of the input current i and storage thereof in the memory, correction of the equivalent resistance value Rc, update of the disturbance-applied compensation amount Lcn by incrementing n, and the like are performed to thereby recalculate (update) the compensation voltage vc. Then, the compensation voltage vc to be applied to the electric power receiving section 2 is changed over to the updated compensation voltage vc. This is repeatedly performed from n=1 to n=N. In this way, the sinusoidal disturbance for one cycle is applied to the currently set reactance compensation amount Lc. In addition, the value (change) of the input current i for one sine wave cycle in the process of sinusoidal change of the reactance compensation amount Lc is also obtained.

Each time the sinusoidal disturbance for one cycle is applied to the currently set reactance compensation amount Lc as described above, an integral value (area) A of the input current i in the first half cycle and an integral value (area) B of the input current i in the second half cycle are compared with each other. It is to be noted that the integral value (area) referred to here is a summation (summation in each half cycle) of each input currents i, stored in the memory, for each disturbance-applied compensation amount Lcn.

Figure 5A:
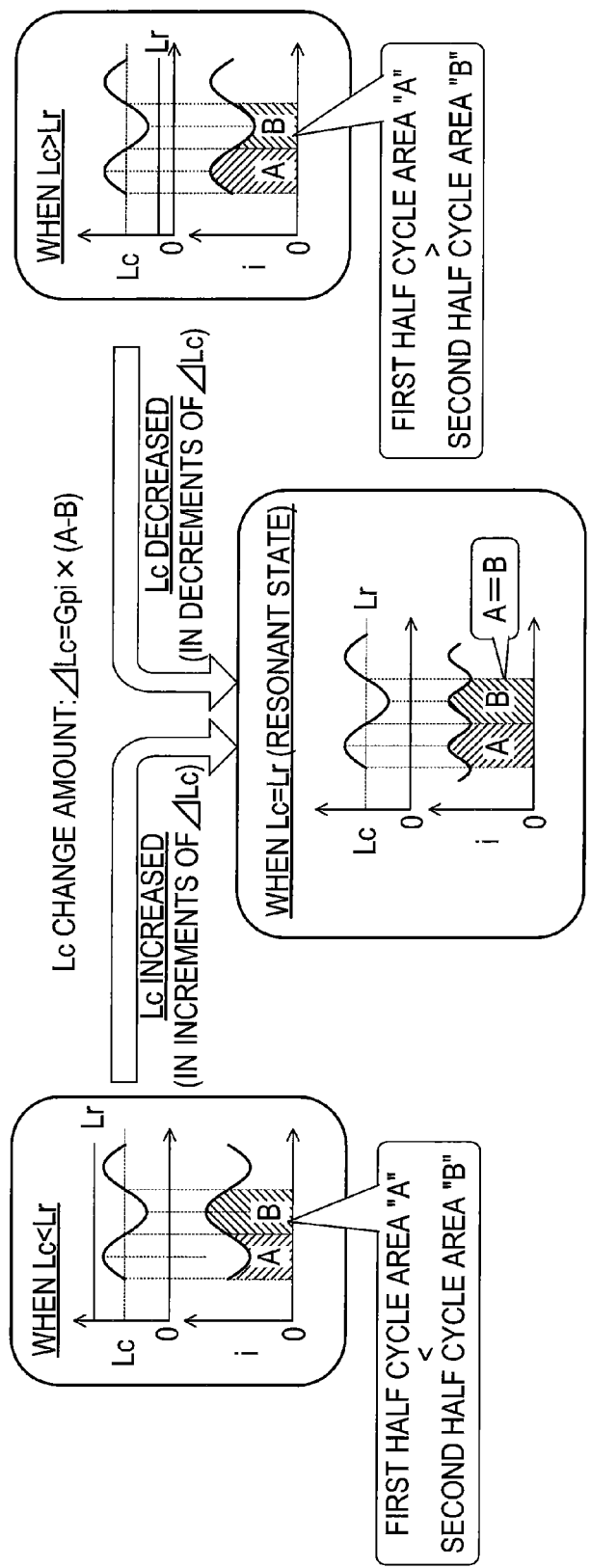
FIG. 5A is an explanatory diagram illustrating a compensation amount search control based on a full-time current detection system (with a power constant control) of a second embodiment.

Supposing that a resonant state has been already achieved, i.e., "the reactance compensation amount Lc=the remaining reactance component Lr" holds, the value of the input current i in the first half cycle in the case where the reactance compensation amount Lc is sinusoidally changed becomes larger as the reactance compensation amount Lc is increased to be away from the remaining reactance component Lr, and becomes smaller again as the reactance compensation amount Lc is then decreased to be closer to the remaining reactance component Lr, as illustrated in the center of FIG. 5A. The value of the input current i in the second half cycle becomes larger as the reactance compensation amount Lc is decreased to be away from the remaining reactance component Lr, and becomes smaller again as the reactance compensation amount Lc is then increased to be closer to the remaining reactance component Lr. The input current i becomes the minimum value when "the reactance compensation amount Lc=the remaining reactance component Lr" holds, and the input current i becomes larger as a difference between the reactance compensation amount Lc and the remaining reactance component Lr becomes larger.

Thus, in the case where "the reactance compensation amount Lc=the remaining reactance component Lr" has already been achieved, the area A of the input current i in the first half cycle and the area B of the input current i in the second half cycle at the time the reactance compensation amount Lc is sinusoidally changed for one cycle are the same as each other (A=B).

On the other hand, in a case where the currently set reactance compensation amount Lc is smaller than the remaining reactance component Lr (Lc<Lr), when the sinusoidal disturbance is applied to the currently set reactance compensation amount Lc, the input current i is changed as illustrated in the left side of FIG. 5A. Specifically, as the reactance compensation amount Lc is increased, the reactance compensation amount Lc gets closer to the remaining reactance component Lr (i.e., the whole electric power receiving device 1 gets closer to a resonant state), and thus, the input current i becomes decreased. In contrast, as the reactance compensation amount Lc is decreased, the reactance compensation amount Lc gets away from the remaining reactance component Lr, and thus, the input current i becomes increased.

Consequently, when "the reactance compensation amount Lc<the remaining reactance component Lr" holds, the area A of the input current i in the first half cycle and the area B of the input current i in the second half cycle in the case where the reactance compensation amount Lc is sinusoidally changed for one cycle are different from each other, and "the area A<the area B" holds. In other words, the integration result of the input current i for one cycle, i.e., "the area A<the area B", indicates that the currently set reactance compensation amount Lc is smaller than the actual remaining reactance component Lr.

Thus, in the present second embodiment, as a result of applying the sinusoidal disturbance for one cycle to the currently set reactance compensation amount Lc, if the area A of the input current i in the first half cycle is smaller than the area B of the input current i in the second half cycle, a set value of the reactance compensation amount Lc is updated to a value larger than the currently set value. Specifically, the change amount $\Delta Lc$ by which the reactance compensation amount Lc is to be changed is calculated by multiplying the area difference (A−B) by a specified gain Gpi, for example. Then, the reactance compensation amount Lc is newly calculated by adding the calculated change amount $\Delta Lc$ to the currently set reactance compensation amount Lc.

How the currently set reactance compensation amount Lc is specifically to be increased based on the area difference (A−B) is not limited to the above method, and various methods can be employed as explained in the first embodiment. That is, a method of calculating and updating the reactance compensation amount Lc based on the area difference (A−B) can be determined as appropriate, as long as the reactance compensation amount Lc can be updated adequately (as long as the reactance compensation amount Lc can be brought closer to the actual remaining reactance component Lr).

The thus-updated new reactance compensation amount Lc should have got closer to the actual remaining reactance component Lr as long as "the reactance compensation amount Lc>the remaining reactance component Lr" does not hold.

Subsequently, the sinusoidal disturbance for one cycle is applied again to the updated new reactance compensation amount Lc, and the integral value (the area A) of the input current i in the first half cycle and the integral value (the area B) of the input current i in the second half cycle are compared with each other. Then, the change amount $\Delta Lc$ is calculated based on the area difference (A−B) similarly to the above, and the set value of the reactance compensation amount Lc is updated. As long as "the area A<the area B" continues to hold, the reactance compensation amount Lc is caused to gradually increase (in increments of the change amount $\Delta Lc$) to thereby cause the reactance compensation amount Lc to come to reach the remaining reactance component Lr.

On the other hand, in a case where the currently set reactance compensation amount Lc is larger than the remaining reactance component Lr (Lc>Lr), when the sinusoidal disturbance is applied to the currently set reactance compensation amount Lc, the input current i is changed as illustrated in the right side of FIG. 5A. Specifically, as the reactance compensation amount Lc is increased, the reactance compensation amount Lc gets away from the remaining reactance component Lr (i.e., the whole electric power receiving device 1 becomes a less resonant state), and thus, the input current i becomes increased. In contrast, as the reactance compensation amount Lc is decreased, the reactance compensation amount Lc gets closer to the remaining reactance component Lr, and thus, the input current i becomes decreased.

Consequently, when "the reactance compensation amount Lc>the remaining reactance component Lr" holds, the area A of the input current i in the first half cycle and the area B of the input current i in the second half cycle in the case where the reactance compensation amount Lc is sinusoidally changed for one cycle are different from each other, and "the area A>the area B" holds. In other words, the integration result of the input current i for one cycle, i.e., "the area A>the area B", indicates that the currently set reactance compensation amount Lc is larger than the actual remaining reactance component Lr.

Thus, in the present second embodiment, as a result of applying the sinusoidal disturbance for one cycle to the currently set reactance compensation amount Lc, if the area A of the input current i in the first half cycle is larger than the area B of the input current i in the second half cycle, the set value of the reactance compensation amount Lc is updated to a value smaller than the currently set value. Specifically, the change amount ΔLc by which the reactance compensation amount Lc is to be changed is calculated by multiplying the area difference (A−B) by a specified gain Gpi, similarly to the case of "the area A<the area B". Then, the calculated change amount ΔLc is subtracted from the currently set reactance compensation amount Lc, to thereby update the reactance compensation amount Lc to a value smaller than the currently set value.

The thus-updated new reactance compensation amount Lc should have got closer to the actual remaining reactance component Lr as long as "the reactance compensation amount Lc<the remaining reactance component Lr" does not hold.

Subsequently, the sinusoidal disturbance for one cycle is applied again to the updated new reactance compensation amount Lc, and the integral value (the area A) of the input current i in the first half cycle and the integral value (the area B) of the input current i in the second half cycle are compared with each other. Then, the change amount ΔLc is calculated based on the area difference (A−B) similarly to the above, and the set value of the reactance compensation amount Lc is updated. As long as "the area A>the area B" continues to hold, the reactance compensation amount Lc is caused to gradually decrease (in decrements of the change amount ΔLc) to thereby cause the reactance compensation amount Lc to come to reach the remaining reactance component Lr.

As described above, in the compensation amount search control based on the full-time current detection system (with the power constant control), the sinusoidal disturbance is applied to the currently set reactance compensation amount Lc; the integral value (the area A) in the first half cycle and the integral value (the area B) in the second half cycle of the input current i are compared with each other; and the reactance compensation amount Lc is increased in increments of the change amount ΔLc when "the area A<the area B" holds, or in contrast, the reactance compensation amount Lc is decreased in decrements of the change amount ΔLc when "the area A>the area B" holds, to thereby bring the reactance compensation amount Lc to be in agreement with the actual remaining reactance component Lr. Then, when "the area A=the area B" is achieved, the reactance compensation amount Lc is assumed to be in agreement with the actual remaining reactance component Lr, and the compensation voltage vc is generated using the currently set reactance compensation amount Lc as it is, and the generated compensation voltage vc is applied.

Through the above-described compensation amount search control based on the full-time current detection system (with the power constant control), the optimum value of the reactance compensation amount Lc is searched, and the compensation voltage vc based on the optimum reactance compensation amount Lc is applied to the electric power receiving section 2, to thereby make it possible, even when the remaining reactance component Lr is present in the electric power receiving section 2, to cancel out such remaining reactance component Lr to allow the electric power receiving device 1 to be in a resonant state (full resonance or a state close thereto) as a whole. Such application of the compensation voltage vc enables the phases of the current and the voltage inputted from the electric power receiving section 2 to the converter 3 to be in agreement with each other, and the electric power receiving device 1 can be operated at a power factor of 1.

Here, an explanation will be given, with reference to FIG. 5B, about a configuration of a parameter calculating section 30 provided in the controller 14 to perform the compensation amount search control based on the full-time current detection system (with the power constant control). In the present second embodiment, a function of performing the compensation amount search control based on the full-time current detection system (with the power constant control) is fulfilled by the parameter calculating section 30 provided in the controller 14.

Figure 5B:
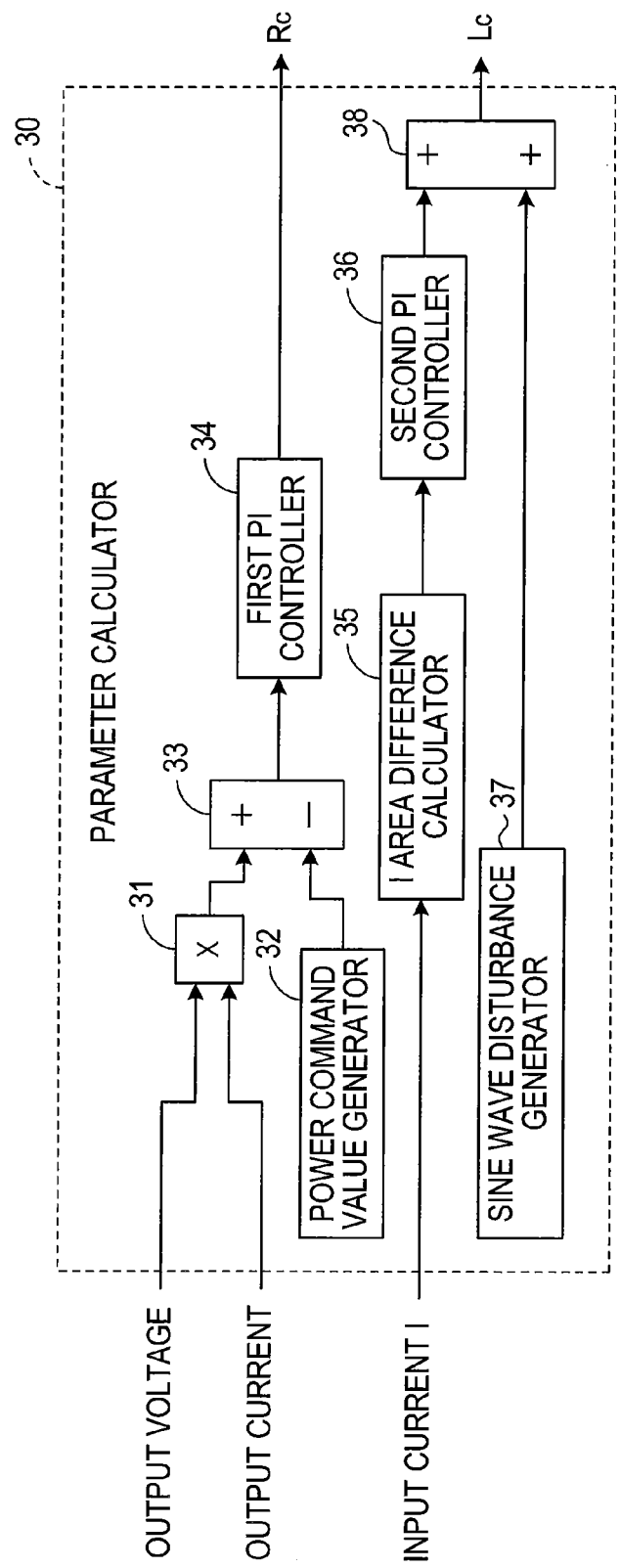
FIG. 5B is a block diagram showing a configuration of a parameter calculating section that performs the compensation amount search control of the second embodiment.

As shown in FIG. 5B, the parameter calculating section 30 of the present second embodiment comprises a multiplier 31, a power command value generator 32, a subtracter 33, a first PI controller 34, an I area difference calculator 35, a second PI controller 36, a sine wave disturbance generator 37, and an adder 38.

From among these, the multiplier 31, the power command value generator 32, the subtracter 33, and the first PI controller 34 are exactly the same as the multiplier 21, the power command value generator 22, the subtracter 23, and the first PI controller 24 in the parameter calculating section 20 of the first embodiment (see FIG. 4C), and thus, detailed explanation on these is omitted. In addition, the sine wave disturbance generator 37 is also the same as the sine wave disturbance generator 25 of the first embodiment.

Each time the sinusoidal disturbance for one cycle is applied to the currently set reactance compensation amount Lc, the I area difference calculator 35 calculates an I area difference, which is a difference between the area A of the input current i in the first half cycle and the area B of the input current i in the second half cycle, in that one cycle.

Each time the sinusoidal disturbance for one cycle is applied to the currently set reactance compensation amount Lc, the second PI controller 36 updates the reactance compensation amount Lc based on the I area difference calculated by the I area difference calculator 35 so that the I area difference becomes zero.

Each time the reactance compensation amount Lc is calculated and updated by the second PI controller 36, the adder 38 applies the sinusoidal disturbance to the calculated new reactance compensation amount Lc based on a sine wave signal from the sine wave disturbance generator 37, similarly to the adder 28 of the first embodiment. Specifically, as explained using the formula (16), the disturbance-applied compensation amount Lcn is generated sequentially (generated in the total number of N in one cycle) in accordance with the sine wave signal.

Each time the disturbance-applied compensation amount Lcn is generated by the adder 38 (i.e., each time the currently set reactance compensation amount Lc is sinusoidally changed from the disturbance-applied compensation amount Lc1 to the disturbance-applied compensation amount LcN), the compensation voltage vc is calculated based on the generated disturbance-applied compensation amount Lcn and the equivalent resistance value Rc and the input current i at that time, and the calculated compensation voltage vc is applied. Then, the input current i at that time is detected and stored in a memory in the I area difference calculator 35, and the stored input current i is used for integration (area calculation).

After the disturbance application for one sine wave cycle to the currently set reactance compensation amount Lc by the adder 38 is finished, the reactance compensation amount Lc is calculated and updated by the second PI controller 36 based on the I area difference calculated by the I area difference calculator 35. At such a time, if the I area difference is zero, the currently set value of the reactance compensation amount Lc is maintained as it is, as described above. On the other hand, if the I area difference is negative (the area A<the area B), the reactance compensation amount Lc is updated to a value larger than the currently set value, and if the I area difference is positive (the area A>the area B), the reactance compensation amount Lc is updated to a value smaller than the currently set value. After the reactance compensation amount Lc is updated in such a manner, the sinusoidal disturbance for one cycle is applied again to the updated new reactance compensation amount Lc by the adder 38, similarly to the above. Then, the reactance compensation amount Lc is further calculated and updated according to the I area difference in that one cycle. Due to such calculation and update being performed repeatedly, the reactance compensation amount Lc comes to reach the optimum value (a value equal to the actual remaining reactance component Lr).

As described above, in the present second embodiment, the phase of the compensation voltage vc is changed by application of the sinusoidal disturbance to the reactance compensation amount Lc, and then, based on the behavior of change in the input current i at the time of such change, the optimum value of the reactance compensation amount Lc is searched. Thus, similarly to the first embodiment, even when the inductance Ls of the secondary coil 5 is changed (and thus, the remaining reactance component Lr in the electric power receiving section 2 is changed) due to various factors, such as variations in characteristics of elements, temperature, and secular changes, resonance at a frequency of the alternating current flowing through the primary coil 150 can be caused to occur easily and appropriately in the electric power receiving device 1 as a whole.

Moreover, in the present second embodiment, too, the power constant control is employed, and in such a case, when the reactance compensation amount Lc is changed (and thus, the compensation voltage vc is changed), the input current i is also changed correspondingly. In this regard, it is comparatively easy to obtain the input current i. Thus, the optimum value of the reactance compensation amount Lc can be searched appropriately by using the input current i as a physical quantity.

Third Embodiment

In the present third embodiment, an explanation will be given of the compensation amount search control based on the full-time current detection system (without the power constant control), which is one of specific methods for the compensation amount search control.

In the present third embodiment, the controller 14 does not perform the power constant control. Thus, a fixed value predetermined based on the resistance value Rs in the secondary coil 5, for example, is used as the equivalent resistance value Rc. That is, in the present third embodiment, the equivalent resistance value Rc is constant (fixed). Thus, as is obvious from the above formula (13), the closer to zero the term (Lr−Lc) is, i.e., the closer to 1 the power factor is, the larger the input current I is.

Thus, in the present third embodiment, change of the input current i is monitored while changing the reactance compensation amount Lc. When the behavior of change in the input current i is the behavior of change caused in a fully resonant state, the reactance compensation amount Lc at that time is determined as the optimum reactance compensation amount Lc that should be set ultimately. This is an outline of the compensation amount search control based on the full-time current detection system (without the power constant control) of the present third embodiment.

Specifically, the compensation amount search control based on the full-time current detection system (without the power constant control) is performed as follows. First, the reactance compensation amount Lc is set at a certain reference value (initial value) Lco. Then, a sinusoidal disturbance for at least one cycle is applied to the reactance compensation amount Lc set at the reference value Lco. That is, the reactance compensation amount Lc is sinusoidally changed.

Application of the sinusoidal disturbance to the reactance compensation amount Lc is performed similarly to the first embodiment. That is, the reactance compensation amount Lc is changed as explained using the formula (16) in the first embodiment. Specifically, the following steps are to be taken.

First, the reactance compensation amount Lc is set at the initial value, and the compensation voltage vc is calculated based on the reactance compensation amount Lc, the equivalent resistance value Rc (constant value), and the input current i. Then, the calculated compensation voltage vc is actually applied to the electric power receiving section 2. Upon application of the compensation voltage vc, the input current i is detected and a value thereof is stored in the memory, similarly to the second embodiment.

Furthermore, application of the disturbance to the reactance compensation amount Lc is performed. Specifically, the disturbance-applied compensation amount Lc1=Lc+sin($2\pi$/N) is obtained by the formula (16) under assumption of n=1, to begin with. Then, the compensation voltage vc is calculated based on the detected input current i and the disturbance-applied compensation amount Lc1, and the compensation voltage vc is actually generated and applied to the electric power receiving section 2.

Each time the compensation voltage vc is calculated and applied, detection and storage of the input current i, and change of the reactance compensation amount Lc are performed through the process similar to the above. Specifically, after the compensation voltage vc is calculated under assumption of n=1 and the calculated compensation voltage vc is applied as described above, the input current i at that time is detected and stored in the memory. Then, application of the disturbance to the reactance compensation amount Lc is performed again. Specifically, the disturbance-applied compensation amount Lc2=Lc+sin($2 \cdot 2\pi$/N) is obtained by the formula (16) under assumption of n=2 (i.e., with n being incremented by 1). Then, the compensation voltage vc is calculated based on the detected input current i, the disturbance-applied compensation amount Lc2, and the equivalent resistance value Rc, and the compensation voltage vc is actually generated and applied to the electric power receiving section 2.

After that, too, each time the compensation voltage vc is applied, detection of the value of the input current i and storage thereof in the memory, update of the disturbance-applied compensation amount Lcn by incrementing n, and the like are performed to thereby recalculate (update) the compensation voltage vc. Then, the compensation voltage vc to be applied to the electric power receiving section 2 is changed over to the updated compensation voltage vc. This is repeatedly performed from n=1 to n=N. In this way, the sinusoidal disturbance for one cycle is applied to the currently set reactance compensation amount Lc. In addition, the value (change) of the input current i for one sine wave cycle in the process of sinusoidal change of the reactance compensation amount Lc is also obtained.

Each time the sinusoidal disturbance for one cycle is applied to the currently set reactance compensation amount Lc as described above, an integral value (area) A of the input current i in the first half cycle and an integral value (area) B of the input current i in the second half cycle are compared with each other, similarly to the second embodiment.

Figure 6A:
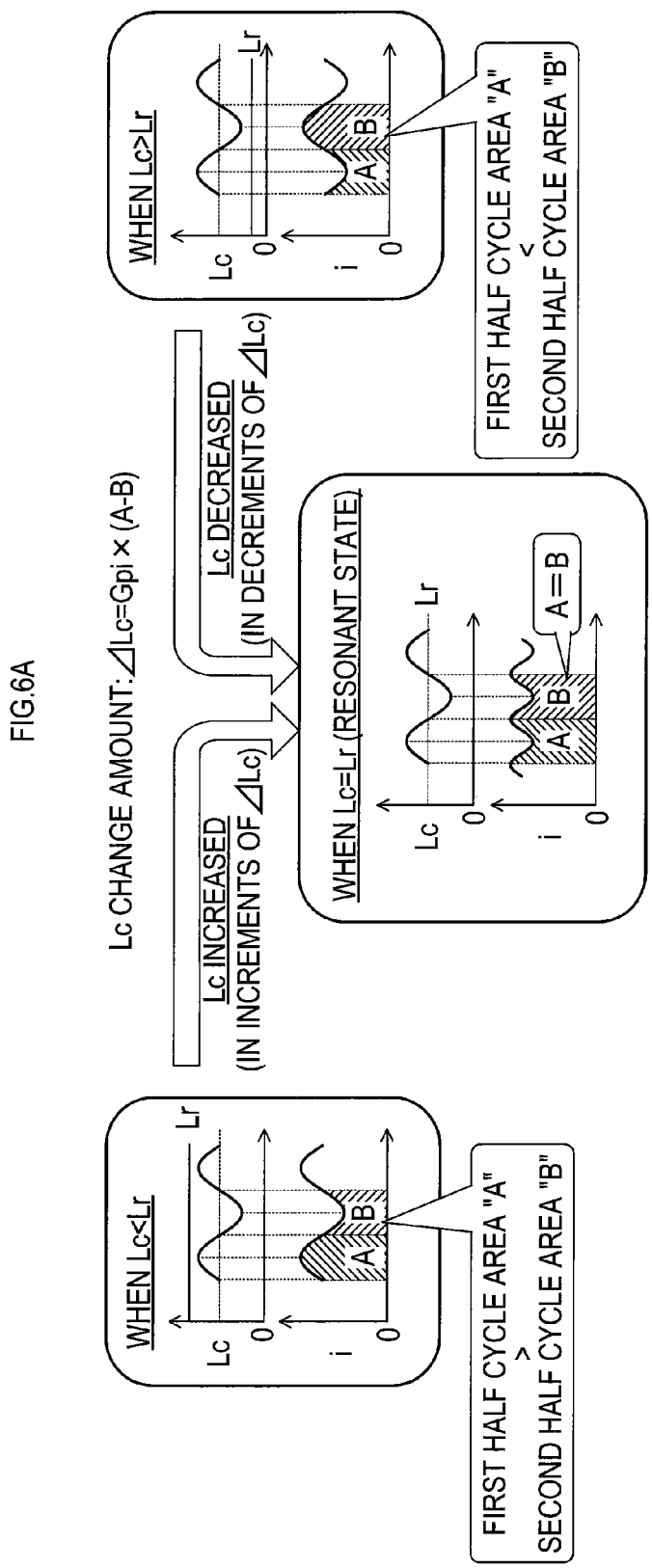
FIG. 6A is an explanatory diagram illustrating a compensation amount search control based on a full-time current detection system (without a power constant control) of a third embodiment.

Supposing that a resonant state has been already achieved, i.e., "the reactance compensation amount Lc=the remaining reactance component Lr" holds, the value of the input current i in the first half cycle in the case where the reactance compensation amount Lc is sinusoidally changed becomes smaller as the reactance compensation amount Lc is increased to be away from the remaining reactance component Lr, and becomes larger again as the reactance compensation amount Lc is then decreased to be closer to the remaining reactance component Lr, as illustrated in the center of FIG. 6A. The value of the input current i in the second half cycle becomes smaller as the reactance compensation amount Lc is decreased to be away from the remaining reactance component Lr, and becomes larger again as the reactance compensation amount Lc is then increased to be closer to the remaining reactance component Lr. The input current i becomes the maximum value when "the reactance compensation amount Lc=the remaining reactance component Lr" holds, and the input current i becomes smaller as a difference between the reactance compensation amount Lc and the remaining reactance component Lr becomes larger.

Thus, in the case where "the reactance compensation amount Lc=the remaining reactance component Lr" has already been achieved, the area A of the input current i in the first half cycle and the area B of the input current i in the second half cycle at the time the reactance compensation amount Lc is sinusoidally changed for one cycle are the same as each other (A=B).

On the other hand, in a case where the currently set reactance compensation amount Lc is smaller than the remaining reactance component Lr (Lc<Lr), when the sinusoidal disturbance is applied to the currently set reactance compensation amount Lc, the input current i is changed as illustrated in the left side of FIG. 6A. Specifically, as the reactance compensation amount Lc is increased, the reactance compensation amount Lc gets closer to the remaining reactance component Lr (i.e., the whole electric power receiving device 1 gets closer to a resonant state), and thus, the input current i becomes increased. In contrast, as the reactance compensation amount Lc is decreased, the reactance compensation amount Lc gets away from the remaining reactance component Lr, and thus, the input current i becomes decreased.

Consequently, when "the reactance compensation amount Lc<the remaining reactance component Lr" holds, the area A of the input current i in the first half cycle and the area B of the input current i in the second half cycle in the case where the reactance compensation amount Lc is sinusoidally changed for one cycle are different from each other, and "the area A>the area B" holds. In other words, the integration result of the input current i for one cycle, i.e., "the area A>the area B", indicates that the currently set reactance compensation amount Lc is smaller than the actual remaining reactance component Lr.

Thus, in the present third embodiment, as a result of applying the sinusoidal disturbance for one cycle to the currently set reactance compensation amount Lc, if the area A of the input current i in the first half cycle is larger than the area B of the input current i in the second half cycle, the set value of the reactance compensation amount Lc is updated to a value larger than the currently set value. Specifically, the change amount ΔLc by which the reactance compensation amount Lc is to be changed is calculated by multiplying the area difference (A−B) by a specified gain Gpi, for example. Then, the reactance compensation amount Lc is newly calculated by adding the calculated change amount ΔLc to the currently set reactance compensation amount Lc.

How the currently set reactance compensation amount Lc is specifically to be increased based on the area difference (A−B) is not limited to the above method, and various methods can be employed as explained in the first embodiment. That is, a method of calculating and updating the reactance compensation amount Lc based on the area difference (A−B) can be determined as appropriate, as long as the reactance compensation amount Lc can be updated adequately (as long as the reactance compensation amount Lc can be brought closer to the actual remaining reactance component Lr).

The thus-updated new reactance compensation amount Lc should have got closer to the actual remaining reactance component Lr as long as "the reactance compensation amount Lc>the remaining reactance component Lr" does not hold.

Subsequently, the sinusoidal disturbance for one cycle is applied again to the updated new reactance compensation amount Lc, and the integral value (the area A) of the input current i in the first half cycle and the integral value (the area B) of the input current i in the second half cycle are compared with each other. Then, the change amount ΔLc is calculated based on the area difference (A−B) similarly to the above, and the reactance compensation amount Lc is updated. As long as "the area A>the area B" continues to hold, the reactance compensation amount Lc is caused to gradually increase (in increments of the change amount ΔLc) to thereby cause the reactance compensation amount Lc to come to reach the remaining reactance component Lr.

On the other hand, in a case where the currently set reactance compensation amount Lc is larger than the remaining reactance component Lr (Lc>Lr), when the sinusoidal disturbance is applied to the currently set reactance compensation amount Lc, the input current i is changed as illustrated in the right side of FIG. 6A. Specifically, as the reactance compensation amount Lc is increased, the reactance compensation amount Lc gets away from the remaining reactance component Lr (i.e., the whole electric power receiving device 1 becomes a less resonant state), and thus, the input current i becomes decreased. In contrast, as the reactance compensation amount Lc is decreased, the reactance compensation amount Lc gets closer to the remaining reactance component Lr, and thus, the input current i becomes increased.

Consequently, when "the reactance compensation amount Lc>the remaining reactance component Lr" holds, the area A of the input current i in the first half cycle and the area B of the input current i in the second half cycle in the case where the reactance compensation amount Lc is sinusoidally changed for one cycle are different from each other, and "the area A<the area B" holds. In other words, the integration result of the input current i for one cycle, i.e., "the area A<the area B", indicates that the currently set reactance compensation amount Lc is larger than the actual remaining reactance component Lr.

Thus, in the present third embodiment, as a result of applying the sinusoidal disturbance for one cycle to the currently set reactance compensation amount Lc, if the area A of the input current i in the first half cycle is smaller than the area B of the input current i in the second half cycle, the set value of the reactance compensation amount Lc is updated to a value smaller than the currently set value. Specifically, the change amount ΔLc by which the reactance compensation amount Lc is to be changed is calculated by multiplying the area difference (A−B) by a specified gain Gpi similarly to the case of "the area A>the area B". Then, the calculated change amount ΔLc is subtracted from the currently set reactance compensation amount Lc, to thereby update the reactance compensation amount Lc to a value smaller than the currently set value.

The thus-updated new reactance compensation amount Lc should have got closer to the actual remaining reactance component Lr as long as "the reactance compensation amount Lc<the remaining reactance component Lr" does not hold.

Subsequently, the sinusoidal disturbance for one cycle is applied again to the updated new reactance compensation amount Lc, and the integral value (the area A) of the input current i in the first half cycle and the integral value (the area B) of the input current i in the second half cycle are compared with each other. Then, the change amount ΔLc is calculated based on the area difference (A−B) similarly to the above, and the reactance compensation amount Lc is updated. As long as "the area A<the area B" continues to hold, the reactance compensation amount Lc is caused to gradually decrease (in decrements of the change amount ΔLc) to thereby cause the reactance compensation amount Lc to come to reach the remaining reactance component Lr.

As described above, in the compensation amount search control based on the full-time current detection system (without the power constant control), the sinusoidal disturbance is applied to the currently set reactance compensation amount Lc; the integral value (the area A) in the first half cycle and the integral value (the area B) in the second half cycle of the input current i are compared with each other; and the reactance compensation amount Lc is increased in increments of the change amount ΔLc when "the area A>the area B" holds, or in contrast, the reactance compensation amount Lc is decreased in decrements of the change amount ΔLc when "the area A<the area B" holds, to thereby bring the reactance compensation amount Lc to be in agreement with the actual remaining reactance component Lr. Then, when "the area A=the area B" is achieved, the reactance compensation amount Lc is assumed to be in agreement with the actual remaining reactance component Lr, and the compensation voltage vc is generated using the currently set reactance compensation amount Lc as it is, and the generated compensation voltage vc is applied.

Through the above-described compensation amount search control based on the full-time current detection system (without the power constant control), the optimum value of the reactance compensation amount Lc is searched, and the compensation voltage vc based on the optimum reactance compensation amount Lc is applied to the electric power receiving section 2, to thereby make it possible, even when the remaining reactance component Lr is present in the electric power receiving section 2, to cancel out such remaining reactance component Lr to allow the electric power receiving device 1 to be in a resonant state (full resonance or a state close thereto) as a whole. Such application of the compensation voltage vc enables the phases of the current and the voltage inputted from the electric power receiving section 2 to the converter 3 to be in agreement with each other, and the electric power receiving device 1 can be operated at a power factor of 1.

Here, an explanation will be given, with reference to FIG. 6B, about a configuration of a parameter calculating section 40 provided in the controller 14 to perform the compensation amount search control based on the full-time current detection system (without the power constant control). In the present third embodiment, a function of performing the compensation amount search control based on the full-time current detection system (without the power constant control) is fulfilled by the parameter calculating section 40 provided in the controller 14.

Figure 6B:
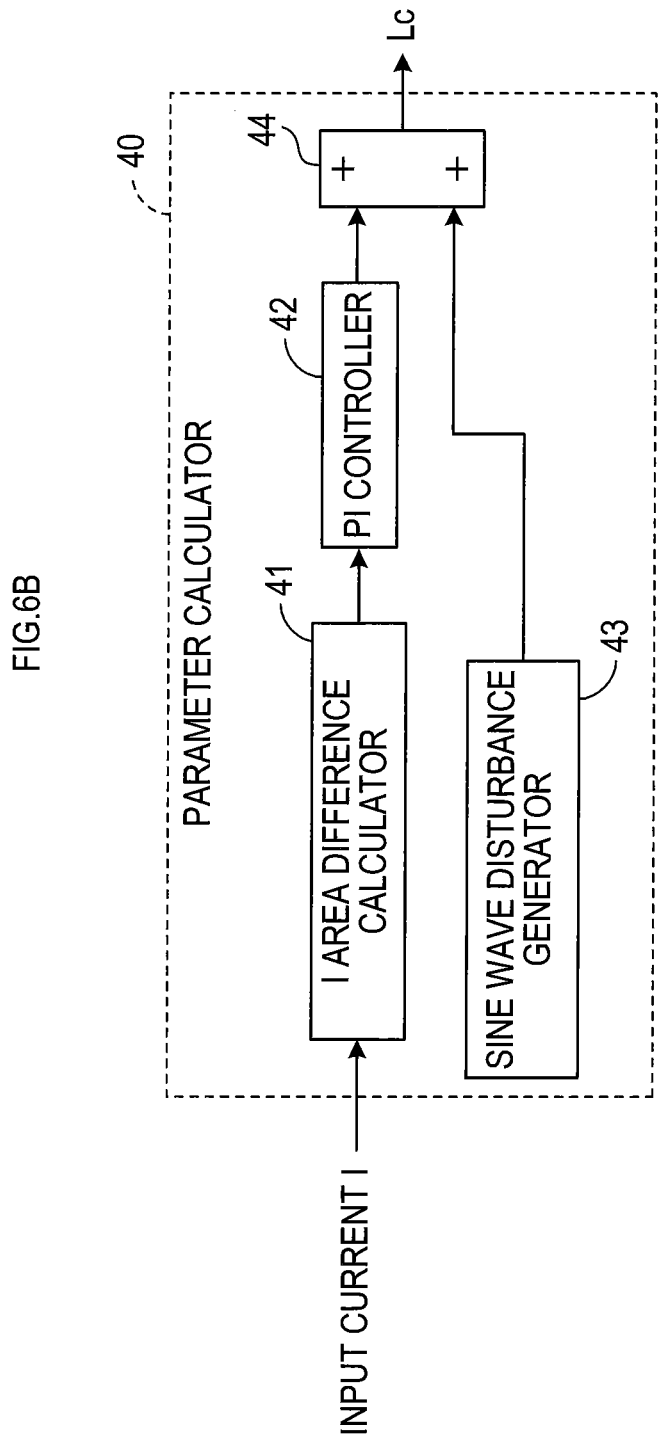
FIG. 6B is a block diagram showing a configuration of a parameter calculating section that performs the compensation amount search control of the third embodiment.

As shown in FIG. 6B, the parameter calculating section 40 of the present third embodiment comprises an I area difference calculator 41, a PI controller 42, a sine wave disturbance generator 43, and an adder 44. From among these, the sine wave disturbance generator 43 is the same as the sine wave disturbance generator 25 of the first embodiment.

Each time the sinusoidal disturbance for one cycle is applied to the currently set reactance compensation amount Lc, the I area difference calculator 41 calculates an I area difference, which is a difference between the area A of the input current i in the first half cycle and the area B of the input current i in the second half cycle, in that one cycle. Each time the sinusoidal disturbance for one cycle is applied to the currently set reactance compensation amount Lc, the PI controller 42 updates the reactance compensation amount Lc based on the I area difference calculated by the I area difference calculator 41 so that the I area difference becomes zero.

Each time the reactance compensation amount Lc is calculated and updated by the PI controller 42, the adder 44 applies the sinusoidal disturbance to the calculated new reactance compensation amount Lc based on a sine wave signal from the sine wave disturbance generator 43, similarly to the adder 28 of the first embodiment. Specifically, as explained using the formula (16), the disturbance-applied compensation amount Lcn is generated sequentially (generated in the total number of N in one cycle) in accordance with the sine wave signal.

Each time the disturbance-applied compensation amount Lcn is generated by the adder 44 (i.e., each time the currently set reactance compensation amount Lc is sinusoidally changed from the disturbance-applied compensation amount Lc1 to the disturbance-applied compensation amount LcN), the compensation voltage vc is calculated based on the generated disturbance-applied compensation amount Lcn, the equivalent resistance value Re, and the input current i, and the calculated compensation voltage vc is applied. Then, the input current i at that time is detected and stored in a memory in the I area difference calculator 41, and the stored input current i is used for integration (area calculation).

After the disturbance application for one sine wave cycle to the currently set reactance compensation amount Lc by the adder 44 is finished, the reactance compensation amount Lc is calculated and updated by the PI controller 42 based on the I area difference calculated by the I area difference calculator 41. At such a time, if the I area difference is zero, the currently set value of the reactance compensation amount Lc is maintained as it is, as described above. On the other hand, if the I area difference is positive (the area A>the area B), the reactance compensation amount Lc is updated to a value larger than the currently set value, and if the I area difference is negative (the area A<the area B), the reactance compensation amount Lc is updated to a value smaller than the currently set value. After the reactance compensation amount Lc is updated in such a manner, the sinusoidal disturbance for one cycle is applied again to the updated new reactance compensation amount Lc by the adder 44, similarly to the above. Then, the reactance compensation amount Lc is further calculated and updated according to the I area difference in that one cycle. Due to such calculation and update being performed repeatedly, the reactance compensation amount Lc comes to reach the optimum value (a value equal to the actual remaining reactance component Lr).

As described above, in the present third embodiment, too, the phase of the compensation voltage vc is changed by application of the sinusoidal disturbance to the reactance compensation amount Lc, and then, based on the behavior of change in the input current i at the time of such change, the optimum value of the reactance compensation amount Lc is searched, similarly to the second embodiment. A primary difference from the second embodiment is whether the power constant control is performed or not. Thus, an operation and effects similar to those in the second embodiment can be obtained.

Fourth Embodiment

In the present fourth embodiment, an explanation will be given of the compensation amount search control based on the full-time power detection system, which is one of specific methods for the compensation amount search control.

In the present fourth embodiment, the controller 14 does not perform the power constant control similarly to the third embodiment. Thus, the equivalent resistance value Rc is constant similarly to the third embodiment.

Since the equivalent resistance value Rc is constant, the closer to zero the term (Lr−Lc) is, i.e., the closer to 1 the power factor is, the larger the input current I is, as is obvious from the above formula (13). Besides, the larger the input current I is, the more increased the output power P is, as is obvious from the above formula (14). That is, in the case where the power constant control is not performed, the closer to 1 the power factor is, the larger the input current is, and also, the more increased the output power P is.

Thus, in the present fourth embodiment, change of the output power P is monitored while changing the reactance compensation amount Lc. When the behavior of change in the output power P is the behavior of change caused in a fully resonant state, the reactance compensation amount Lc at that time is determined as the optimum reactance compensation amount Lc that should be set ultimately. This is an outline of the compensation amount search control based on the full-time power detection system of the present fourth embodiment.

Specifically, the compensation amount search control based on the full-time power detection system is performed as follows. First, the reactance compensation amount Lc is set at a certain reference value (initial value) Lco. Then, a sinusoidal disturbance for at least one cycle is applied to the reactance compensation amount Lc set at the reference value Lco. That is, the reactance compensation amount Lc is sinusoidally changed.

Application of the sinusoidal disturbance to the reactance compensation amount Lc is performed similarly to the first embodiment. That is, the reactance compensation amount Lc is changed as explained using the formula (16) in the first embodiment. Specifically, the following steps are to be taken.

First, the reactance compensation amount Lc is set at the initial value, and the compensation voltage vc is calculated based on the reactance compensation amount Lc, the equivalent resistance value Rc (constant value), and the input current i. Then, the calculated compensation voltage vc is actually applied to the electric power receiving section 2. Upon application of the compensation voltage vc, the output power P is calculated based on the output current and the output voltage, and the calculated output power P is stored in the memory.

Furthermore, application of the disturbance to the reactance compensation amount Lc is performed. Specifically, the disturbance-applied compensation amount Lc1=Lc+sin(2π/N) is obtained by the formula (16) under assumption of n=1, to begin with. Then, the compensation voltage vc is calculated based on the detected input current i and the disturbance-applied compensation amount Lc1, and the compensation voltage vc is actually generated and applied to the electric power receiving section 2.

Each time the compensation voltage vc is calculated and applied, calculation and storage of the output power P, and change of the reactance compensation amount Lc are performed through the process similar to the above. Specifically, after the compensation voltage vc is calculated under assumption of n=1 and the calculated compensation voltage vc is applied as described above, the output power P at that time is calculated and stored in the memory. Then, application of the disturbance to the reactance compensation amount Lc is performed again. Specifically, the disturbance-applied compensation amount Lc2=Lc+sin(2·2π/N) is obtained by the formula (16) under assumption of n=2 (i.e., with n being incremented by 1). Then, the compensation voltage vc is calculated based on the input current i, the disturbance-applied compensation amount Lc2, and the equivalent resistance value Rc, and the compensation voltage vc is actually generated and applied to the electric power receiving section 2.

After that, too, each time the compensation voltage vc is applied, calculation of the output power P and storage thereof in the memory, update of the disturbance-applied compensation amount Lcn by incrementing n, and the like are performed to thereby recalculate (update) the compensation voltage vc. Then, the compensation voltage vc to be applied to the electric power receiving section 2 is changed over to the updated compensation voltage vc. This is repeatedly performed from n=1 to n=N. In this way, the sinusoidal disturbance for one cycle is applied to the currently set reactance compensation amount Lc. In addition, the value (change) of the output power P for one sine wave cycle in the process of sinusoidal change of the reactance compensation amount Lc is also obtained.

Each time the sinusoidal disturbance for one cycle is applied to the currently set reactance compensation amount Lc as described above, an integral value (area) A of the output power P in the first half cycle and an integral value (area) B of the output power P in the second half cycle are compared with each other.

Figure 7A:
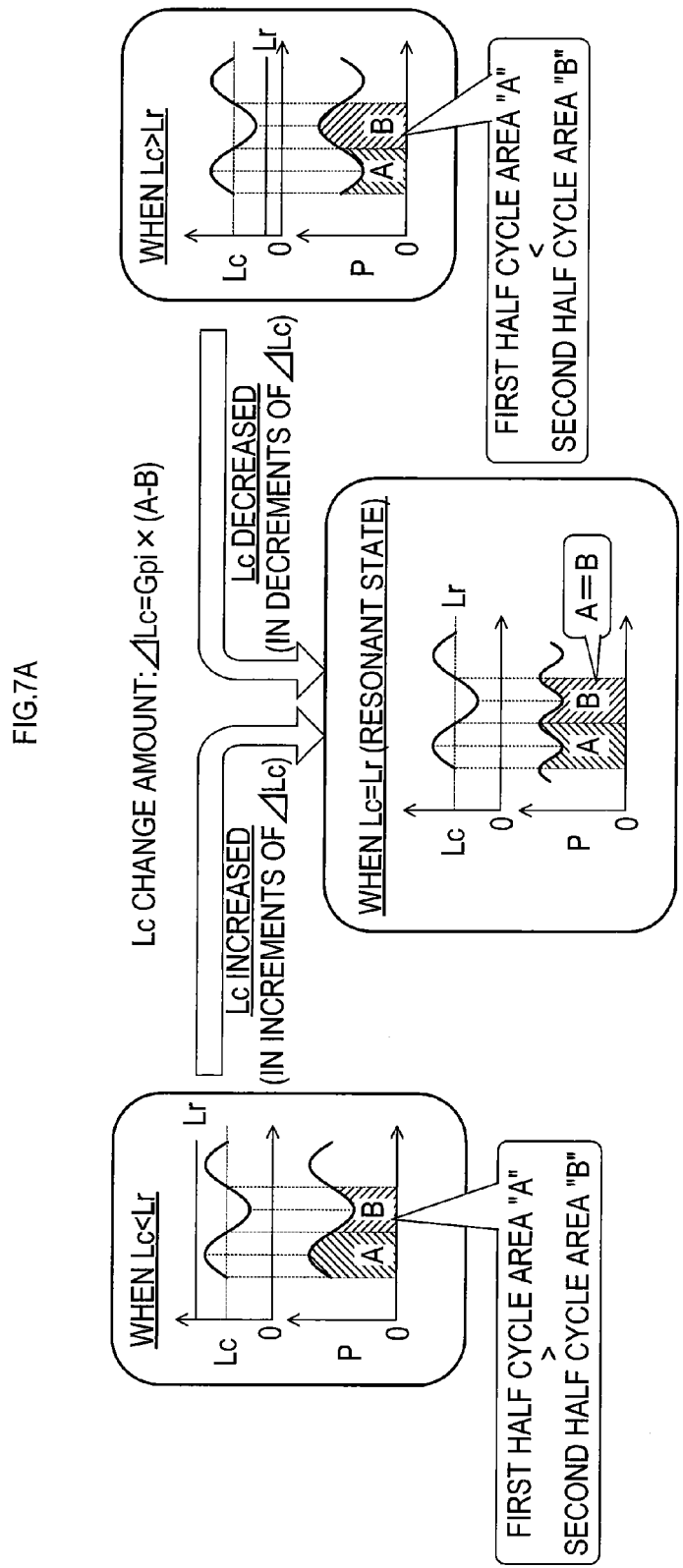
FIG. 7A is an explanatory diagram illustrating a compensation amount search control based on a full-time power detection system of a fourth embodiment.

Supposing that a resonant state has been already achieved, i.e., "the reactance compensation amount Lc=the remaining reactance component Lr" holds, the value of the output power P in the first half cycle in the case where the reactance compensation amount Lc is sinusoidally changed becomes smaller as the reactance compensation amount Lc is increased to be away from the remaining reactance component Lr, and becomes larger again as the reactance compensation amount Lc is then decreased to be closer to the remaining reactance component Lr, as illustrated in the center of FIG. 7A. The value of the output power P in the second half cycle becomes smaller as the reactance compensation amount Lc is decreased to be away from the remaining reactance component Lr, and becomes larger again as the reactance compensation amount Lc is then increased to be closer to the remaining reactance component Lr. The output power P becomes the maximum value when "the reactance compensation amount Lc=the remaining reactance component Lr" holds, and the output power P becomes smaller as a difference between the reactance compensation amount Lc and the remaining reactance component Lr becomes larger.

Thus, in the case where "the reactance compensation amount Lc=the remaining reactance component Lr" has already been achieved, the area A of the output power P in the first half cycle and the area B of the output power P in the second half cycle at the time the reactance compensation amount Lc is sinusoidally changed for one cycle are the same as each other (A=B).

On the other hand, in a case where the currently set reactance compensation amount Lc is smaller than the remaining reactance component Lr (Lc<Lr), when the sinusoidal disturbance is applied to the currently set reactance compensation amount Lc, the output power P is changed as illustrated in the left side of FIG. 7A. Specifically, as the reactance compensation amount Lc is increased, the reactance compensation amount Lc gets closer to the remaining reactance component Lr (i.e., the whole electric power receiving device 1 becomes closer to a resonant state), and thus, the output power P becomes increased. In contrast, as the reactance compensation amount Lc is decreased, the reactance compensation amount Lc gets away from the remaining reactance component Lr, and thus, the output power P becomes decreased.

Consequently, when "the reactance compensation amount Lc<the remaining reactance component Lr" holds, the area A of the output power P in the first half cycle and the area B of the output power P in the second half cycle in the case where the reactance compensation amount Lc is sinusoidally changed for one cycle are different from each other, and "the area A>the area B" holds. In other words, the integration result of the output power P for one cycle, i.e., "the area A>the area B", indicates that the currently set reactance compensation amount Lc is smaller than the actual remaining reactance component Lr.

Thus, in the present fourth embodiment, as a result of applying the sinusoidal disturbance for one cycle to the currently set reactance compensation amount Lc, if the area A of the output power P in the first half cycle is larger than the area B of the output power P in the second half cycle, the set value of the reactance compensation amount Lc is updated to a value larger than the currently set value. Specifically, the change amount $\Delta Lc$ by which the reactance compensation amount Lc is to be changed is calculated by multiplying the area difference (A−B) by a specified gain Gpi, for example. Then, the reactance compensation amount Lc is newly calculated by adding the calculated change amount $\Delta Lc$ to the currently set reactance compensation amount Lc.

How the currently set reactance compensation amount Lc is specifically to be increased based on the area difference (A−B) is not limited to the above method, and various methods can be employed as explained in the first embodiment. That is, a method of calculating and updating the reactance compensation amount Lc based on the area difference (A−B) can be determined as appropriate, as long as the reactance compensation amount Lc can be updated adequately (as long as the reactance compensation amount Lc can be brought closer to the actual remaining reactance component Lr).

The thus-updated new reactance compensation amount Lc should have got closer to the actual remaining reactance component Lr as long as "the reactance compensation amount Lc>the remaining reactance component Lr" does not hold.

Subsequently, the sinusoidal disturbance for one cycle is applied again to the updated new reactance compensation amount Lc, and the integral value (the area A) of the output power P in the first half cycle and the integral value (the area B) of the output power P in the second half cycle are compared with each other. Then, the change amount $\Delta Lc$ is calculated based on the area difference (A−B) similarly to the above, and the set value of the reactance compensation amount Lc is updated. As long as "the area A>the area B" continues to hold, the reactance compensation amount Lc is caused to gradually increase (in increments of the change amount $\Delta Lc$) to thereby cause the reactance compensation amount Lc to come to reach the remaining reactance component Lr.

On the other hand, in a case where the currently set reactance compensation amount Lc is larger than the remaining reactance component Lr (Lc>Lr), when the sinusoidal disturbance is applied to the currently set reactance compensation amount Lc, the output power P is changed as illustrated in the right side of FIG. 7A. Specifically, as the reactance compensation amount Lc is increased, the reactance compensation amount Lc gets away from the remaining reactance component Lr (i.e., the whole electric power receiving device 1 becomes a less resonant state), and thus, the output power P becomes decreased. In contrast, as the reactance compensation amount Lc is decreased, the reactance compensation amount Lc gets closer to the remaining reactance component Lr, and thus, the output power P becomes increased.

Consequently, when "the reactance compensation amount Lc>the remaining reactance component Lr" holds, the area A of the output power P in the first half cycle and the area B of the output power P in the second half cycle in the case where the reactance compensation amount Lc is sinusoidally changed for one cycle are different from each other, and "the area A<the area B" holds. In other words, the integration result of the output power P for one cycle, i.e., "the area A<the area B", indicates that the currently set reactance compensation amount Lc is larger than the actual remaining reactance component Lr.

Thus, in the present fourth embodiment, as a result of applying the sinusoidal disturbance for one cycle to the currently set reactance compensation amount Lc, if the area A of the output power P in the first half cycle is smaller than the area B of the output power P in the second half cycle, the set value of the reactance compensation amount Lc is updated to a value smaller than the currently set value. Specifically, the change amount $\Delta Lc$ by which the reactance compensation amount Lc is to be changed is calculated by multiplying the area difference (A−B) by a specified gain Gpi, similarly to the case of "the area A>the area B". Then, the calculated change amount $\Delta Lc$ is subtracted from the currently set reactance compensation amount Lc, to thereby update the reactance compensation amount Lc to a value smaller than the currently set value.

The thus-updated new reactance compensation amount Lc should have got closer to the actual remaining reactance component Lr as long as "the reactance compensation amount Lc<the remaining reactance component Lr" does not hold.

Subsequently, the sinusoidal disturbance for one cycle is applied again to the updated new reactance compensation amount Lc, and the integral value (the area A) of the output power P in the first half cycle and the integral value (the area B) of the output power P in the second half cycle are compared with each other. Then, the change amount ΔLc is calculated based on the area difference (A−B) similarly to the above, and the set value of the reactance compensation amount Lc is updated. As long as "the area A<the area B" continues to hold, the reactance compensation amount Lc is caused to gradually decrease (in decrements of the change amount ΔLc) to thereby cause the reactance compensation amount Lc to come to reach the remaining reactance component Lr.

As described above, in the compensation amount search control based on the full-time power detection system, the sinusoidal disturbance is applied to the currently set reactance compensation amount Lc; the integral value (the area A) in the first half cycle and the integral value (the area B) in the second half cycle of the output power P are compared with each other; and the reactance compensation amount Lc is increased in increments of the change amount ΔLc when "the area A>the area B" holds, or in contrast, the reactance compensation amount Lc is decreased in decrements of the change amount ΔLc when "the area A<the area B" holds, to thereby bring the reactance compensation amount Lc to be in agreement with the actual remaining reactance component Lr. Then, when "the area A=the area B" is achieved, the reactance compensation amount Lc is assumed to be in agreement with the actual remaining reactance component Lr, and the compensation voltage vc is generated using the currently set reactance compensation amount Lc as it is, and the generated compensation voltage vc is applied.

Through the above-described compensation amount search control based on the full-time power detection system, the optimum value of the reactance compensation amount Lc is searched, and the compensation voltage vc based on the optimum reactance compensation amount Lc is applied to the electric power receiving section 2, to thereby make it possible, even when the remaining reactance component Lr is present in the electric power receiving section 2, to cancel out such remaining reactance component Lr to allow the electric power receiving device 1 to be in a resonant state (full resonance or a state close thereto) as a whole. Such application of the compensation voltage vc enables the phases of the current and the voltage inputted from the electric power receiving section 2 to the converter 3 to be in agreement with each other, and the electric power receiving device 1 can be operated at a power factor of 1.

Here, an explanation will be given, with reference to FIG. 7B, about a configuration of a parameter calculating section 50 provided in the controller 14 to perform the compensation amount search control based on the full-time power detection system. In the present fourth embodiment, a function of performing the compensation amount search control based on the full-time power detection system is fulfilled by the parameter calculating section 50 provided in the controller 14.

Figure 7B:
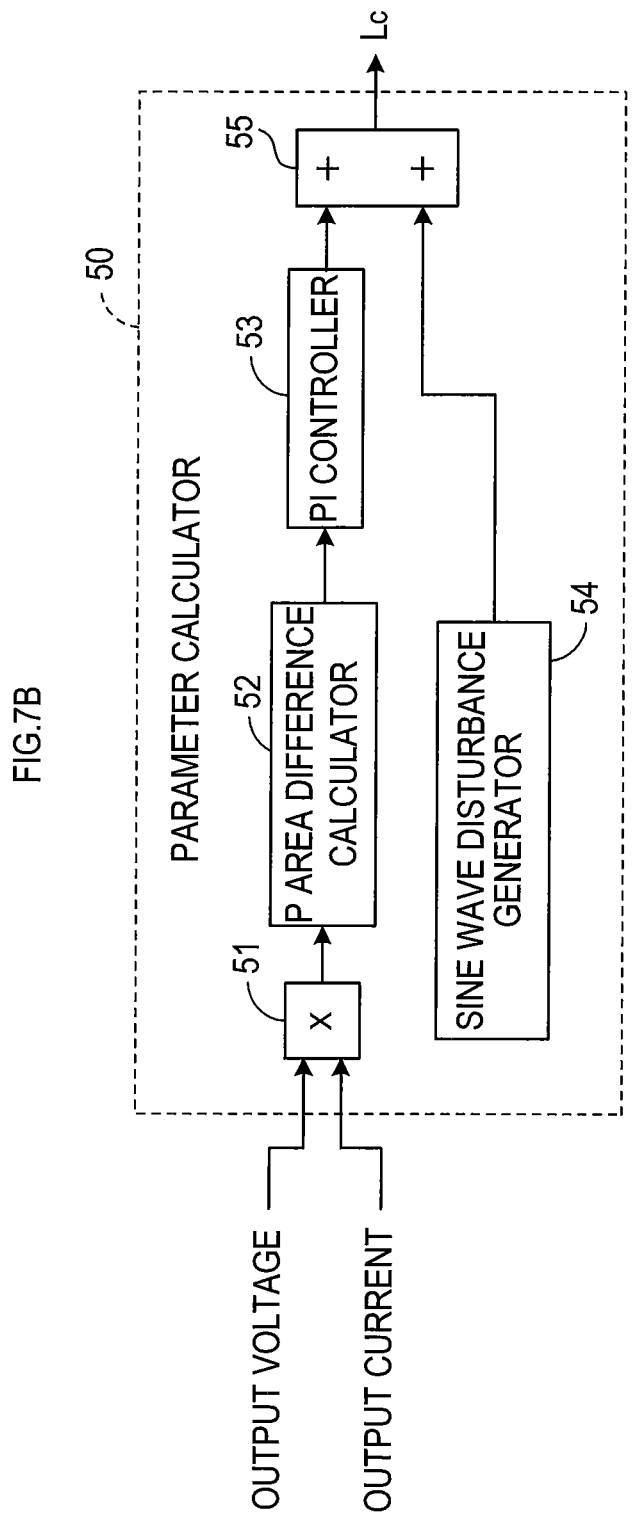
FIG. 7B is a block diagram showing a configuration of a parameter calculating section that performs the compensation amount search control of the fourth embodiment.

As shown in FIG. 7B, the parameter calculating section 50 of the present fourth embodiment comprises a multiplier 51, a P area difference calculator 52, a PI controller 53, a sine wave disturbance generator 54, and an adder 55. From among these, the sine wave disturbance generator 54 is the same as the sine wave disturbance generator 25 of the first embodiment. Similarly to the multiplier 21 of the first embodiment, the multiplier 51 also calculates the output power P by multiplying the output current by the output voltage.

Each time the sinusoidal disturbance for one cycle is applied to the currently set reactance compensation amount Lc, the P area difference calculator 52 calculates a P area difference, which is a difference between the area A of the output power P in the first half cycle and the area B of the output power P in the second half cycle, in that one cycle. Each time the sinusoidal disturbance for one cycle is applied to the currently set reactance compensation amount Lc, the PI controller 53 updates the reactance compensation amount Lc based on the P area difference calculated by the P area difference calculator 52 so that the P area difference becomes zero.

Each time the reactance compensation amount Lc is calculated and updated by the PI controller 53, the adder 55 applies the sinusoidal disturbance to the calculated new reactance compensation amount Lc based on a sine wave signal from the sine wave disturbance generator 54, similarly to the adder 28 of the first embodiment. Specifically, as explained using the formula (16), the disturbance-applied compensation amount Lcn is generated sequentially (generated in the total number of N in one cycle) in accordance with the sine wave signal.

Each time the disturbance-applied compensation amount Lcn is generated by the adder 55 (i.e., each time the currently set reactance compensation amount Lc is sinusoidally changed from the disturbance-applied compensation amount Lc1 to the disturbance-applied compensation amount UN), the compensation voltage vc is calculated based on the generated disturbance-applied compensation amount Lcn, the equivalent resistance value Re, and the input current i, and the calculated compensation voltage vc is applied. Then, the output power P at that time is calculated by the multiplier 51 and stored in a memory in the P area difference calculator 52, and the stored output power P is used for integration (area calculation).

After the disturbance application for one sine wave cycle to the currently set reactance compensation amount Lc by the adder 55 is finished, the reactance compensation amount Lc is calculated and updated by the PI controller 53 based on the P area difference calculated by the P area difference calculator 52. At such a time, if the P area difference is zero, the currently set value of the reactance compensation amount Lc is maintained as it is, as described above. On the other hand, if the P area difference is positive (the area A>the area B), the reactance compensation amount Lc is updated to a value larger than the currently set value, and if the P area difference is negative (the area A<the area B), the reactance compensation amount Lc is updated to a value smaller than the currently set value. After the reactance compensation amount Lc is updated in such a manner, the sinusoidal disturbance for one cycle is applied again to the updated new reactance compensation amount Lc by the adder 55, similarly to the above. Then, the reactance compensation amount Lc is further calculated and updated according to the P area difference in that one cycle. Due to such calculation and update being performed repeatedly, the reactance compensation amount Lc comes to reach the optimum value (a value equal to the actual remaining reactance component Lr).

As described above, in the present fourth embodiment, the phase of the compensation voltage vc is changed by application of the sinusoidal disturbance to the reactance compensation amount Lc, and then, based on the behavior of change in the output power P at the time of such change, the optimum value of the reactance compensation amount Lc is searched. Thus, similarly to the first embodiment, even when the inductance Ls of the secondary coil 5 is changed (and thus, the remaining reactance component Lr in the electric power receiving section 2 is changed) due to various factors, such as variations in characteristics of elements, temperature, and secular changes, resonance at a frequency of the alternating current flowing through the primary coil 150 can be caused to occur easily and appropriately in the electric power receiving device 1 as a whole.

As the reactance compensation amount Lc is changed (and thus, the compensation voltage vc is changed), the output power P is also changed correspondingly. Besides, it is comparatively easy to obtain (calculate) the output power P. Thus, the optimum value of the reactance compensation amount Lc can be searched appropriately by using the output power P as a physical quantity.

Fifth Embodiment

In the present fifth embodiment, an explanation will be given of the compensation amount search control based on the startup-time current detection system, which is one of specific methods for the compensation amount search control.

In the present fifth embodiment, the controller 14 does not perform the power constant control. However, it is not essential that the power constant control is not performed in the startup-time current detection system, and it is also possible to search the reactance compensation amount Lc while performing the power constant control.

Similarly to the third embodiment, when the equivalent resistance value Rc is fixed at a certain constant value, the closer to zero the term (Lr−Lc) is, i.e., the closer to 1 the power factor is, the larger the input current I is, as is obvious from the above formula (13).

Thus, in the present fifth embodiment, the reactance compensation amount Lc is swept within a specified range (corresponding to an example of a second change pattern of the present disclosure). Specifically, the reactance compensation amount Lc is caused to increase in increments of very small amount from a specified value lower than an expected value, or is caused to decrease in decrements of very small amount from a specified value higher than the expected value. Each time the reactance compensation amount Lc is caused to increase (or decrease) in increments of very small amount, the compensation voltage vc is calculated based on the reactance compensation amount Lc, the equivalent resistance value Rc, and the input current i at that time, and the calculated compensation voltage vc is applied. Then, the input current i at the time of such application is detected, and the detected input current i is stored in a memory.

Subsequently, the reactance compensation amount Lc is caused to increase (or decrease) again in decrements of very small amount, and the compensation voltage vc is calculated based on the reactance compensation amount Lc, the equivalent resistance value Rc, and the input current i, and the calculated compensation voltage vc is applied. Then, the input current i at the time of such application is detected and stored.

In this way, while sweeping the reactance compensation amount Lc in increments of very small amount, the input current i is detected and stored each time. Then, the reactance compensation amount Lc at the time the input current i has become the maximum value is determined as the optimum reactance compensation amount Lc that should be set ultimately. For example, in the case where the reactance compensation amount Lc is swept gradually from a low value in an increasing direction, as the reactance compensation amount Lc gets closer to the remaining reactance component Lr, the input current i becomes increased, and when the reactance compensation amount Lc becomes in agreement with the remaining reactance component Lr, the input current i becomes the maximum value. Then, as the reactance compensation amount Lc is further caused to increase to exceed the remaining reactance component Lr, the input current i shifts to decrease.

Thus, in the case where the reactance compensation amount Lc is swept in the increasing direction, the value of the reactance compensation amount Lc at the time the input current i shifts from increase to decrease (i.e., at the time the input current i becomes the maximum value) is the optimum value to be set (a value equal or close to the remaining reactance component Lr). Similarly, in a case where the reactance compensation amount Lc is swept in a decreasing direction, the value of the reactance compensation amount Lc at the time the input current i shifts from decrease to increase (i.e., at the time the input current i becomes the minimum value) is the optimum value to be set (a value equal or close to the remaining reactance component Lr).

Figure 8:
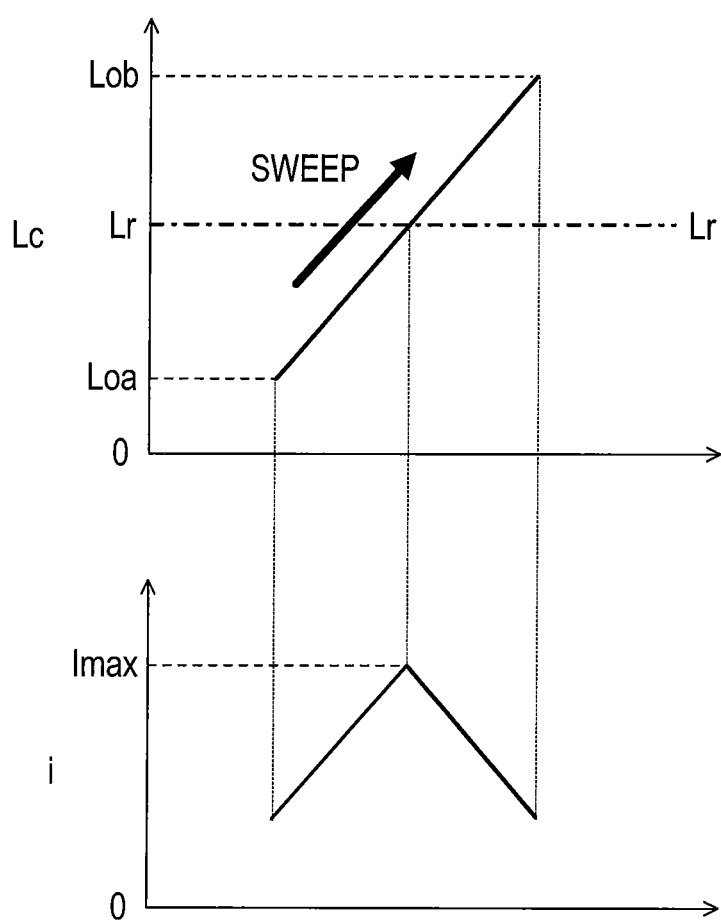
FIG. 8 is an explanatory diagram illustrating a compensation amount search control based on a startup-time current detection system of a fifth embodiment.

A specific example is shown in FIG. 8. As shown in FIG. 8, a range in which the reactance compensation amount Lc is to be swept is set at a range from Loa to Lob. This range can be determined as appropriate, and it is possible, for example, to estimate the remaining reactance component Lr in the electric power receiving section 2 and to set the range within a specified range including the estimated remaining reactance component Lr (e.g., within a specified range centered at the remaining reactance component Lr).

Then, the reactance compensation amount Lc is set at the minimum value Loa in the sweep range, and the compensation voltage vc is generated and applied. The input current i at that time is detected and stored. Then, the reactance compensation amount Lc is caused to increase by very small amount (e.g., by the change amount ΔLc set in advance) from the currently set value (Loa), and the compensation voltage vc is generated based on the increased reactance compensation amount Lc. The generated compensation voltage vc is applied, and the input current i at that time is detected and stored. Then, the reactance compensation amount Lc is caused to further increase by very small amount (the change amount ΔLc) from the currently set value, and the compensation voltage vc is generated similarly to the above. The generated compensation voltage vc is applied, and the input current i is detected and stored. In this way, the reactance compensation amount Lc is swept (caused to increase in increments of the change amount ΔLc, in the present example), and the above-described process is repeated each time the reactance compensation amount Lc is caused to increase by the change amount ΔLc. When the reactance compensation amount Lc has reached Lob, the reactance compensation amount Lc at the time the input current i is the maximum value Imax is detected based on the change of the input current i so far. Then, the reactance compensation amount Lc at the time the input current i is the maximum value Imax is determined as the reactance compensation amount Lc that should be set ultimately.

It is to be noted that sweep of the reactance compensation amount Lc does not necessarily have to be performed over the entire sweep range set in advance. For example, it may be possible that change of the input current i is monitored while sweeping the reactance compensation amount Lc from a certain value and that, when it is detected that the input current i is shifted from increase to decrease (i.e., that the input current i has become the maximum value Imax), the sweep is terminated at that point and the reactance compensation amount Lc at the time the input current i has become the maximum value Imax is fixed as a final reactance compensation amount Lc.

In this way, in the compensation amount search control based on the startup-time current detection system of the present fifth embodiment, change of the input current i is monitored while sweeping the reactance compensation amount Lc, and the reactance compensation amount Lc at the time the input current i has become the maximum value is searched. Then, when the input current i has become the maximum value, the reactance compensation amount Lc at that time is fixed as the final reactance compensation amount Lc.

Once the reactance compensation amount Lc is fixed, it is possible, thereafter, that the compensation voltage vc is generated using the reactance compensation amount Lc, and the generated compensation voltage vc is applied to the electric power receiving section 2, to thereby make it possible, even when the remaining reactance component Lr is present in the electric power receiving section 2, to cancel out such remaining reactance component Lr to allow the electric power receiving device 1 to be in a resonant state (full resonance or a state close thereto) as a whole. Such application of the compensation voltage vc enables the phases of the current and the voltage inputted from the electric power receiving section 2 to the converter 3 to be in agreement with each other, and the electric power receiving device 1 can be operated at a power factor of 1.

Basically, the compensation amount search control based on the startup-time current detection system of the present fifth embodiment is performed by the converter 3 when the converter 3 is activated. When activated, the converter 3 performs the above-described compensation amount search control based on the startup-time current detection system to thereby search and fix the optimum value of the reactance compensation amount Lc. Once the optimum value of the reactance compensation amount Lc is fixed, the compensation voltage vc is generated using the fixed reactance compensation amount Lc and the generated compensation voltage vc is applied.

However, the compensation amount search control based on the startup-time current detection system does not necessarily have to be performed when the converter 3 is activated, and may be performed upon a lapse of a specified period of time from activation. Moreover, it is not necessarily the case that the compensation amount search control has to be performed only at activation. Even after activation, the compensation amount search control of the present fifth embodiment may be performed, as appropriate, according to an operation state of the converter 3, a state of the load 4, necessity of power supply to the load 4, and so on, to thereby calculate and update the optimum value of the reactance compensation amount Lc.

As described above, in the present fifth embodiment, the reactance compensation amount Lc at the time the input current i has become the maximum value is searched while sweeping the reactance compensation amount Lc. In short, the reactance compensation amount Lc is searched while monitoring the value of the input current i itself. Thus, the optimum value of the reactance compensation amount Lc can be searched easily.

It is to be noted that the compensation amount search control based on the startup-time current detection system of the present fifth embodiment can also be performed with the power constant control being performed. In the case where the power constant control is performed, as the whole electric power receiving device 1 gets closer to a resonant state (i.e., as the reactance compensation amount Lc gets closer to the remaining reactance component Lr), the input current i becomes decreased, and in contrast, as the whole electric power receiving device 1 becomes a less resonant state (i.e., as the reactance compensation amount Lc gets away from the remaining reactance component Lr), the input current i becomes increased, as explained in the second embodiment.

Consequently, under the power constant control, it is only required that the input current i is monitored while sweeping the reactance compensation amount Lc, to thereby search the reactance compensation amount Lc at the time the input current i has become the minimum value. Thus, it is only required that, when the input current i has become the minimum value, the reactance compensation amount Lc at that time is fixed as the final reactance compensation amount Lc.

Other Embodiments

In the first to fourth embodiments, the respective compensation amount search controls have been explained as being performed constantly while the converter 3 is running. However, it is not essential to perform the compensation amount search control constantly. For example, the compensation amount search control may be performed at a specified timing of performance while the converter 3 is running; may be performed at an irregular timing or periodically (intermittently); or may be performed only once at activation (or upon a lapse of the specified period of time from activation) similarly to the fifth embodiment.

(2) In the case where the power constant control is not performed (the third to fifth embodiments), once the reactance compensation amount Lc is fixed, the electric power receiving device 1 becomes a resonant state. Thus, it may be possible that, after the optimum value of the reactance compensation amount Lc is fixed, the equivalent resistance value Rc is set as appropriate, to thereby obtain the output power P desired.

When the optimum value of the reactance compensation amount Lc is fixed (when "the reactance compensation amount Lc=the remaining reactance component Lr" holds), the term (Lr−Lc) becomes zero in the above formula (15), and thus, the output power P can be represented by a following formula (17) based on the formula (15).

$$P=V_s^2 \cdot R_c/(R_s+R_c)^2 \qquad (17)$$

Thus, once the optimum value of the reactance compensation amount Lc is fixed, it is possible to supply the load 4 with the maximum power that can be supplied by, for example, setting the equivalent resistance value Rc so that the above formula (17) obtains the maximum value. In a case where an arbitrary output power P is desired to be obtained, it is only required to calculate and set the equivalent resistance value Rc corresponding to such output power P.

(3) The disturbance used in the compensation amount search control is not limited to the sinusoidal disturbance. Any disturbance can be used, as long as a specific physical quantity is varied by application of the disturbance and the reactance compensation amount Lc can be caused to come to reach the optimum value based on such variation.

For example, various disturbances, such as a triangular wave, a square wave, and other forms of waves can be used. Alternatively, for example, at least one of a positive disturbance and a negative disturbance may be applied irregularly. Preferably, the positive disturbance and the negative disturbance may be applied so that the respective summations of the positive disturbance and the negative disturbance applied to the currently set reactance compensation amount Lc are equal to each other. The sine wave used as the disturbance in the above embodiments has a positive period (the first half cycle) and a negative period (the second half cycle), the lengths of which are equal to each other, and the summations (the areas) in the respective periods are also equal to each other, and thus, is suitable for the disturbance used.

In the case where periodic disturbance is applied like the sinusoidal disturbance used in the above embodiments, it is not essential to apply such a disturbance for one cycle. It may be possible to apply the disturbance for a specified number of cycles, i.e., for two or more cycles, and to cause the reactance compensation amount Lc to come to reach the optimum value based on the behavior of change in the physical quantity (e.g., the integral value) in the specified number of cycles.

Still alternatively, a stepwise disturbance may be applied. For example, a disturbance having a specified value Ln may be applied to the currently set reactance compensation amount Lc at least once both in a positive direction and in a negative direction. Specifically, it may be possible to compare the physical quantity (the input current i, the output power P, the equivalent resistance value Re, and so on) at the time the disturbance having a specified positive value Ln (+Ln) is applied to the reactance compensation amount Lc (i.e., Lc+Ln) and the physical quantity at the time the disturbance having a specified negative value Ln (−Ln) is applied to the reactance compensation amount Lc (i.e., Lc−Ln) with each other, and to calculate and update the reactance compensation amount Lc (to bring the reactance compensation amount Lc closer to the optimum value) based on a result of the comparison.

(4) In the fifth embodiment, the compensation amount search control based on the startup-time current detection system has been explained. In such compensation amount search control, an object to be detected may be a physical quantity other than the input current i. Specifically, if there is any other physical quantity that is changed with the sweep of the reactance compensation amount Lc, the reactance compensation amount Lc at the point in which such a physical quantity is shifted from increase to decrease or from decrease to increase can be fixed as the optimum value, in a manner similar to the above fifth embodiment.

Specifically, the output power P can be used, for example. When the power constant control is not performed, as the reactance compensation amount Lc gets closer to the remaining reactance component Lr, the output power P becomes increased, and in contrast, as the reactance compensation amount Lc gets away from the remaining reactance component Lr, the output power P becomes decreased, similarly to the input current i. Thus, the change of the output power P at the time the reactance compensation amount Lc is swept shows the same tendency as that of the input current i shown in FIG. 8. Consequently, the optimum value of the reactance compensation amount Lc can be searched based on the change of the output power P at the time the reactance compensation amount Lc is swept.

(5) In the first to fourth embodiments, too, the physical quantity to be integrated is not limited to that in each of the embodiments. As long as the physical quantity is changed with the change of the disturbance applied to the reactance compensation amount Lc, various physical quantities can be employed as an object to be integrated.

(6) In the electric power receiving section 2, the resonance capacitor 6 is not essential. One feature of the present disclosure is that the reactance compensation amount Lc that cancel out the remaining reactance component Lr in the electric power receiving section 2 is calculated by the converter 3, and that the compensation voltage vc based on the reactance compensation amount Lc is applied to the electric power receiving section 2. Thus, the electric power receiving section 2 itself does not necessarily have to include the series resonance circuit, and the electric power receiving section 2 is only required to include at least the secondary coil 5 that receives power from the primary coil 150 via magnetic coupling.

However, in the case where the series resonance circuit is not provided in the electric power receiving section 2, there is a possibility that a processing load borne by the converter 3 is increased. Thus, it may be possible to provide, in the electric power receiving section 2, the series resonance circuit that resonates at the frequency f of the alternating current flowing through the primary coil 150, and when the remaining reactance component Lr is generated, to compensate (cancel out) the remaining reactance component Lr by the compensation voltage vc from the converter 3, as in the above embodiments.

(7) The present disclosure is not limited to the specific means, structures, and so on shown in the above embodiments, and can be practiced in various forms within a scope not departing from the spirit of the present disclosure. For example, part of the configuration of each of the above embodiments may be substituted by a known configuration having similar functions, may be added to or replace the configuration of the other embodiments, or may be omitted. Alternatively, the above-described multiple embodiments may be combined with each other as appropriate.

What is claimed is:

1. An electric power receiving device comprising:
an electric power receiving section comprising a pair of output terminals and a secondary coil to be electromagnetically coupled to a primary coil through which a first alternating current flows, the electric power receiving section being configured to output, via the pair of output terminals, an alternating voltage that is based on an induced electromotive force generated in the secondary coil; and
a converting section configured to convert the alternating voltage outputted from the electric power receiving section into a direct voltage,
wherein the converting section comprises a compensation voltage generating section configured to generate a compensation voltage having a frequency approximately equal to that of the alternating voltage and being capable of canceling out a reactance component in the electric power receiving section, and to apply the compensation voltage between the pair of output terminals,
wherein the compensation voltage generating section comprises:
a phase changing section configured to change a phase of the compensation voltage to be applied between the pair of output terminals in a specified change pattern;
a physical quantity detecting section configured to detect a specified physical quantity changed with change of the phase of the compensation voltage by the phase changing section; and
a searching section configured to search a target phase of the compensation voltage that brings the electric power receiving device into a substantially resonant state, based on the physical quantity detected by the physical quantity detecting section, and wherein the compensation voltage generating section is configured to determine the compensation voltage having the target phase searched by the searching section as the compensation voltage to be applied between the pair of output terminals.

2. The electric power receiving device according to claim 1,
wherein the searching section is configured to search the target phase that causes a behavior of change in the physical quantity detected by the physical quantity detecting section to become a resonance behavior indicating that the electric power receiving device is in the substantially resonant state.

3. The electric power receiving device according to claim 2,
wherein the compensation voltage generating section comprises:
a current detecting section configured to detect a second alternating current that is based on the alternating voltage outputted from the electric power receiving section;
an equivalent reactance component setting section configured to set an equivalent reactance component in the converting section; and
a compensation voltage calculating section configured to calculate the compensation voltage by a specified calculation that is based on the equivalent reactance component set by the equivalent reactance component setting section and the second alternating current detected by the current detecting section,
wherein the phase changing section is configured to change the phase of the compensation voltage by changing the equivalent reactance component set by the equivalent reactance component setting section in the change pattern,
wherein the searching section is configured to obtain the equivalent reactance component at the time the behavior of change becomes the resonance behavior, as information indicating the phase of the compensation voltage, and
wherein the equivalent reactance component setting section is configured to determine the equivalent reactance component obtained by the searching section as the equivalent reactance component to be set.

4. The electric power receiving device according to claim 3,
wherein the phase changing section is configured to perform a first change control in which the equivalent reactance component set by the equivalent reactance component setting section is changed in a first change pattern,
wherein the searching section is configured to perform a first resonance determination in which it is determined whether the behavior of change has become the resonance behavior when the first change control is performed,
wherein the equivalent reactance component setting section is configured, when the behavior of change is determined to have become the resonance behavior in the first resonance determination, to maintain the currently set equivalent reactance component, and when the behavior of change is determined not to have become the resonance behavior in the first resonance determination, to perform an update process in which the equivalent reactance component is updated so that the behavior of change becomes the resonance behavior, based on a result of comparison between the behavior of change and the resonance behavior,
wherein the phase changing section is configured to perform the first change control to the updated equivalent reactance component each time the update process is performed by the equivalent reactance component setting section, and
wherein the searching section is configured to perform the first resonance determination each time the update process is performed by the equivalent reactance component setting section.

5. The electric power receiving device according to claim 4,
wherein the phase changing section is configured to perform the first change control by sinusoidally changing the equivalent reactance component set by the equivalent reactance component setting section, for at least one cycle,
wherein the searching section is configured to calculate a first integral value, which is an integral value of the physical quantity in a first half cycle, and a second integral value, which is an integral value of the physical quantity in a second half cycle, at the time the equivalent reactance component is sinusoidally changed for one cycle by the first change control in the first resonance determination, and to determine that the behavior of change has become the resonance behavior in a case where the first integral value is in agreement with the second integral value.

6. The electric power receiving device according to claim 1,
wherein the physical quantity comprises a second alternating current that is based on the alternating voltage outputted from the electric power receiving section.

7. The electric power receiving device according to claim 1,
wherein the compensation voltage generating section comprises a power detecting section configured to detect a power outputted from the converting section, and
wherein the physical quantity comprises the power detected by the power detecting section.

8. The electric power receiving device according to claim 3,
wherein the compensation voltage generating section comprises:
a power detecting section configured to detect a power outputted from the converting section; and
an equivalent resistance setting section configured to set an equivalent resistance value in the converting section so that the power detected by the power detecting section is in agreement with a target power set in advance,
wherein the compensation voltage calculating section is configured to calculate the compensation voltage by a specified calculation that is based on the equivalent reactance component set by the equivalent reactance component setting section, the equivalent resistance value set by the equivalent resistance setting section, and the second alternating current detected by the current detecting section, and
wherein the physical quantity comprises the equivalent resistance value set by the equivalent resistance setting section.

9. The electric power receiving device according to claim 3, wherein the phase changing section is configured to perform a second change control in which the equivalent reactance component set by the equivalent reactance component setting section is changed in a second change pattern, wherein change in the second change pattern comprises either of increasing the equivalent reactance component from a specified initial value or decreasing the equivalent reactance component from the initial value, wherein the searching section is configured to perform a second resonance determination in which it is determined whether the behavior of change has become the resonance behavior when the second change control is performed, and wherein the equivalent reactance component setting section is configured to determine the equivalent reactance component at the time the behavior of change is determined to have become the resonance behavior in the second resonance determination as the equivalent reactance component to be set.

10. A method of receiving electric power comprising:

providing an electric power receiving device comprising an electric power receiving section and a converting section, the electric power receiving section comprising a pair of output terminals and a secondary coil to be electromagnetically coupled to a primary coil through which a first alternating current flows, the electric power receiving section being configured to output, via the pair of output terminals, an alternating voltage that is based on an induced electromotive force generated in the secondary coil, the converting section being configured to convert the alternating voltage outputted from the electric power receiving section into a direct voltage;

generating a compensation voltage having a frequency approximately equal to that of the alternating voltage and being capable of canceling out a reactance component in the electric power receiving section;

applying the generated compensation voltage between the pair of output terminals;

changing a phase of the compensation voltage in a specified change pattern;

detecting a specified physical quantity changed with change of the phase of the compensation voltage;

searching a target phase of the compensation voltage that brings the electric power receiving device into a substantially resonant state, based on the detected physical quantity; and determining the compensation voltage having the searched target phase as the compensation voltage to be applied between the pair of output terminals.

11. The method of receiving electric power according to claim 10, wherein the searching the target phase of the compensation voltage comprises searching the target phase that causes a behavior of change in the detected physical quantity to become a resonance behavior indicating that the electric power receiving device is in the substantially resonant state.

* * * * *